United States Patent
Kato et al.

(10) Patent No.: US 10,365,874 B2
(45) Date of Patent: Jul. 30, 2019

(54) INFORMATION PROCESSING FOR BAND CONTROL OF A COMMUNICATION STREAM

(71) Applicant: SONY CORPORATION, Tokyo (JP)

(72) Inventors: Kimiya Kato, Tokyo (JP); Sho Amano, Tokyo (JP); Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/762,306

(22) PCT Filed: Oct. 24, 2013

(86) PCT No.: PCT/JP2013/078771
§ 371 (c)(1),
(2) Date: Jul. 21, 2015

(87) PCT Pub. No.: WO2014/115387
PCT Pub. Date: Jul. 31, 2014

(65) Prior Publication Data
US 2015/0363153 A1 Dec. 17, 2015

(30) Foreign Application Priority Data

Jan. 28, 2013 (JP) ................................ 2013-013458

(51) Int. Cl.
*G06F 3/14* (2006.01)
*G09G 5/12* (2006.01)
(Continued)

(52) U.S. Cl.
CPC ............... *G06F 3/14* (2013.01); *G06F 3/013* (2013.01); *G06F 3/1454* (2013.01); *G09G 5/003* (2013.01); *G09G 5/12* (2013.01); *G09G 5/14* (2013.01); *G06F 2200/1614* (2013.01); *G09G 2340/02* (2013.01); *G09G 2340/04* (2013.01); *G09G 2340/0407* (2013.01); *G09G 2340/14* (2013.01); *G09G 2350/00* (2013.01); *G09G 2354/00* (2013.01); *G09G 2370/16* (2013.01); *G09G 2370/20* (2013.01)

(58) Field of Classification Search
CPC ..................................................... G06F 3/1454
See application file for complete search history.

(56) References Cited

U.S. PATENT DOCUMENTS 5,765,045 A * 6/1998 Takagi .................. G02B 7/287
396/51
5,912,721 A * 6/1999 Yamaguchi .......... G06K 9/0061
351/209

(Continued)

*Primary Examiner* — Jitesh Patel
(74) *Attorney, Agent, or Firm* — Chip Law Group

(57) ABSTRACT

[Object] To perform appropriate transmission band control. [Solving Means] An information processing apparatus includes an acquisition section and a controller. Here, the acquisition section acquires user information generated by a user operation when information based on a stream communicated between another information processing apparatus via wireless communication is output from an output section. The controller performs band control of the stream communicated between another information processing apparatus via wireless communication based on the user information acquired by the acquisition section.

17 Claims, 23 Drawing Sheets

(51) Int. Cl.
*G09G 5/14* (2006.01)
*G06F 3/01* (2006.01)
*G09G 5/00* (2006.01)

(56) References Cited

U.S. PATENT DOCUMENTS

| | | | |
|---|---|---|---|
| 9,253,229 B1* | 2/2016 | Strothmann | H04N 21/2662 |
| 2002/0141614 A1* | 10/2002 | Lin | G06F 3/013 |
| | | | 382/103 |
| 2003/0052911 A1* | 3/2003 | Cohen-Solal | H04L 29/06027 |
| | | | 715/738 |
| 2003/0194142 A1* | 10/2003 | Kortum | H04N 19/162 |
| | | | 382/239 |
| 2004/0174496 A1* | 9/2004 | Ji | G06F 3/013 |
| | | | 351/209 |
| 2004/0207635 A1* | 10/2004 | Miller | H04N 1/00 |
| | | | 345/617 |
| 2004/0227699 A1* | 11/2004 | Mitchell | A61B 3/113 |
| | | | 345/44 |
| 2005/0018911 A1* | 1/2005 | Deever | H04N 19/597 |
| | | | 382/232 |
| 2005/0169546 A1* | 8/2005 | Shin | G08B 13/19645 |
| | | | 382/239 |
| 2005/0243054 A1* | 11/2005 | Beymer | A61B 3/0033 |
| | | | 345/156 |
| 2006/0256083 A1* | 11/2006 | Rosenberg | G06F 3/013 |
| | | | 345/156 |
| 2007/0279591 A1* | 12/2007 | Wezowski | G06F 3/013 |
| | | | 351/208 |
| 2008/0109865 A1* | 5/2008 | Su | H04N 21/23436 |
| | | | 725/116 |
| 2008/0285800 A1* | 11/2008 | Miyake | H04N 5/44 |
| | | | 382/103 |
| 2008/0297589 A1* | 12/2008 | Kurtz | H04N 7/147 |
| | | | 348/14.16 |
| 2009/0086165 A1* | 4/2009 | Beymer | A61B 3/113 |
| | | | 351/210 |
| 2009/0110245 A1* | 4/2009 | Thorn | G03B 13/00 |
| | | | 382/118 |
| 2009/0164896 A1* | 6/2009 | Thorn | G06F 1/1626 |
| | | | 715/700 |
| 2009/0183085 A1* | 7/2009 | Pasetto | G06F 3/1431 |
| | | | 715/744 |
| 2009/0300692 A1* | 12/2009 | Mavlankar | H04N 21/23431 |
| | | | 725/94 |
| 2010/0056274 A1* | 3/2010 | Uusitalo | G02B 27/017 |
| | | | 463/31 |
| 2010/0070912 A1* | 3/2010 | Zaman | G06F 3/0481 |
| | | | 715/784 |
| 2010/0220897 A1* | 9/2010 | Ueno | G06K 9/00208 |
| | | | 382/115 |
| 2010/0229210 A1* | 9/2010 | Sharp | H04L 47/10 |
| | | | 725/109 |
| 2011/0050656 A1* | 3/2011 | Sakata | G06F 3/011 |
| | | | 345/204 |
| 2011/0170067 A1* | 7/2011 | Sato | A61B 5/0496 |
| | | | 351/209 |
| 2011/0175932 A1* | 7/2011 | Yu | G06F 3/013 |
| | | | 345/661 |
| 2011/0202843 A1* | 8/2011 | Morris | G06F 3/013 |
| | | | 715/716 |
| 2011/0206283 A1* | 8/2011 | Quarfordt | G06K 9/0061 |
| | | | 382/220 |
| 2011/0211114 A1* | 9/2011 | Cooper | H04N 21/44218 |
| | | | 348/441 |
| 2011/0279666 A1* | 11/2011 | Strombom | A61B 3/113 |
| | | | 348/78 |
| 2012/0078623 A1* | 3/2012 | Vertegaal | G06F 3/011 |
| | | | 704/231 |
| 2012/0146891 A1* | 6/2012 | Kalinli | G06F 3/013 |
| | | | 345/156 |
| 2012/0154557 A1* | 6/2012 | Perez | H04N 21/25891 |
| | | | 348/53 |
| 2012/0256967 A1* | 10/2012 | Baldwin | G06F 3/013 |
| | | | 345/684 |
| 2012/0272179 A1* | 10/2012 | Stafford | G06F 3/012 |
| | | | 715/781 |
| 2012/0295708 A1* | 11/2012 | Hernandez-Abrego | G10L 15/26 |
| | | | 463/36 |
| 2012/0319928 A1* | 12/2012 | Rhodes | G02B 27/017 |
| | | | 345/8 |
| 2013/0093838 A1* | 4/2013 | Tan | H04N 7/144 |
| | | | 348/14.16 |
| 2013/0106674 A1* | 5/2013 | Wheeler | G02B 27/017 |
| | | | 345/8 |
| 2013/0141518 A1* | 6/2013 | Chou | H04N 7/148 |
| | | | 348/14.08 |
| 2013/0169560 A1* | 7/2013 | Cederlund | G06F 3/013 |
| | | | 345/173 |
| 2013/0176250 A1* | 7/2013 | Lee | G06F 3/013 |
| | | | 345/173 |
| 2013/0241805 A1* | 9/2013 | Gomez | G09G 3/003 |
| | | | 345/8 |
| 2013/0321265 A1* | 12/2013 | Bychkov | G06F 3/013 |
| | | | 345/156 |
| 2013/0321462 A1* | 12/2013 | Salter | G06F 1/163 |
| | | | 345/633 |
| 2014/0184550 A1* | 7/2014 | Hennessey | G06F 3/013 |
| | | | 345/173 |
| 2014/0285641 A1* | 9/2014 | Kato | G06F 3/013 |
| | | | 348/54 |
| 2016/0034029 A1* | 2/2016 | Lyons | G06F 3/013 |
| | | | 715/748 |

* cited by examiner a b

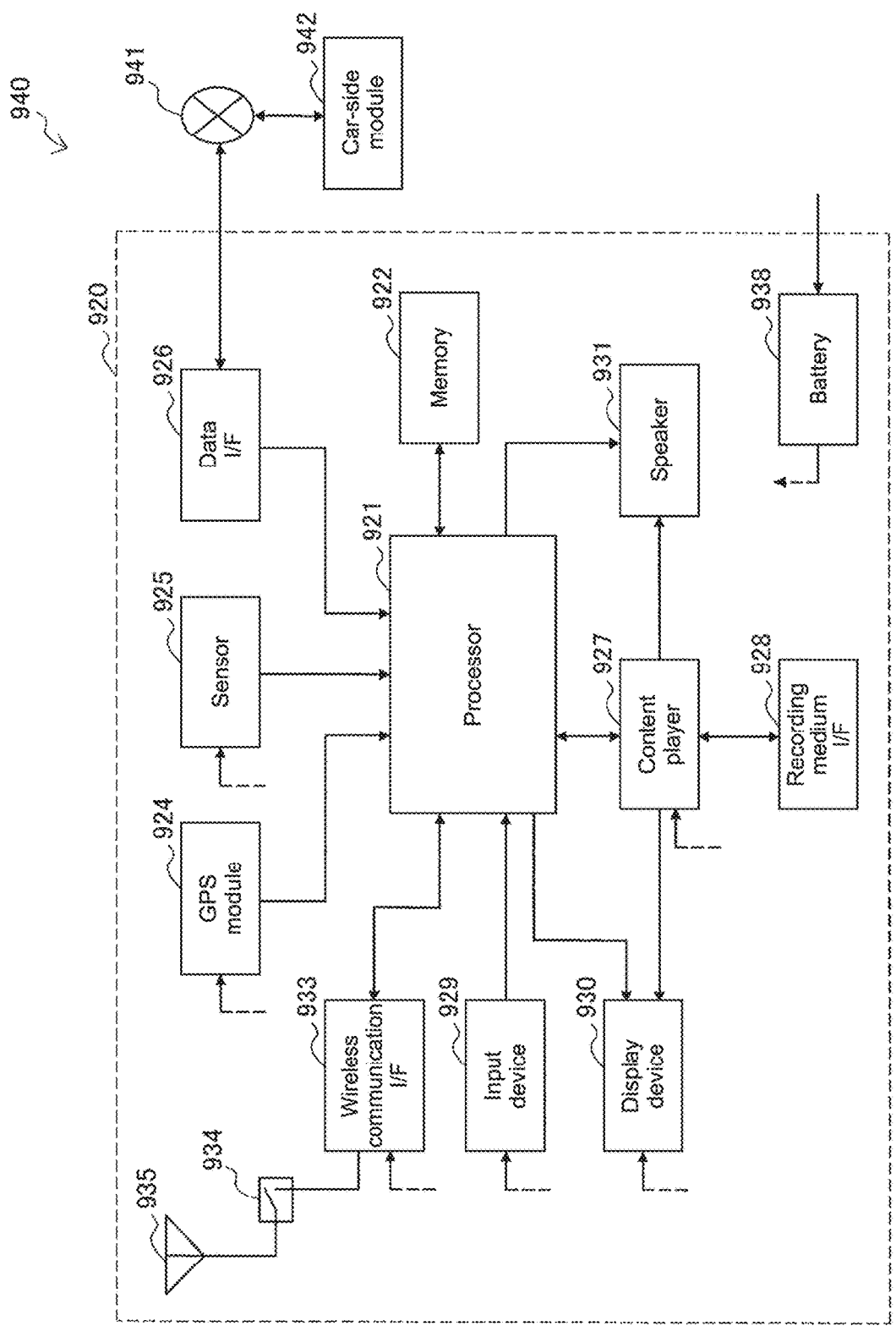

INFORMATION PROCESSING FOR BAND CONTROL OF A COMMUNICATION STREAM

TECHNICAL FIELD

The present disclosure relates to an information processing apparatus, more specifically, to an information processing apparatus used for exchanging various types of information via wireless communication, an information processing method, and a program that causes a computer to execute the method.

BACKGROUND ART

From the past, there has been a wireless communication technique used for exchanging various types of data via wireless communication. For example, there is proposed an information exchange device used for exchanging various types of data between two wireless communication apparatuses via wireless communication (see, for example, Patent Document 1).

Patent Document 1: Japanese Patent Application Laid-open No. 2008-278388

SUMMARY OF INVENTION

Problem to be Solved by the Invention

According to the conventional technique described above, it is possible to exchange various types of data between two wireless communication apparatuses via wireless communication even when not connected to a wired line. For example, it is possible to display an image that is based on image data transmitted from a transmission-side information processing apparatus on a display section of a reception-side information processing apparatus.

When an image that is based on image data transmitted from a transmission-side information processing apparatus is displayed on a display section of a reception-side information processing apparatus as described above, a user might be focusing on only a part of the image. The user may also do things other than viewing the image. Therefore, it is important to carry out transmission band control that suits user's situations.

The present disclosure has been made in view of the above-mentioned circumstances and aims at carrying out appropriate transmission band control.

Means for Solving the Problem

The present disclosure has been made to solve the problems described above, and according to a first aspect of the present disclosure, there is provided an information processing apparatus including: an acquisition section that acquires user information generated by a user operation when information based on a stream communicated between another information processing apparatus via wireless communication is output from an output section; and a controller that performs band control of the stream based on the acquired user information, an information processing method, and a program that causes a computer to execute the method. Accordingly, an operation that stream band control is performed based on the acquired user information is obtained.

Further, according to the first aspect, the information processing apparatus may further include the output section, the output section may output information based on the stream transmitted from the another information processing apparatus, and the controller may perform the band control of the stream transmitted from the another information processing apparatus based on the acquired user information. Accordingly, an operation that the band control of the stream transmitted from another information processing apparatus is performed based on the acquired user information is obtained.

Further, according to the first aspect, each output section may output information based on a stream transmitted from a plurality of another information processing apparatuses, and the controller may perform the band control of the stream based on the acquired user information. Accordingly, an operation that the band control of the streams is performed based on the acquired user information is obtained.

Further, according to the first aspect, the controller may transmit a control signal for performing the band control of the stream transmitted from the another information processing apparatus to the another information processing apparatus. Accordingly, an operation that the control signal for performing the band control of the stream transmitted from another information processing apparatus is transmitted to the another information processing apparatus is obtained.

Further, according to the first aspect, the output section may be a display section that displays an image based on the stream, and the acquisition section may acquire the user information generated by a user operation related to the image displayed on the display section. Accordingly, an operation that the user information generated by the user operation related to the image displayed on the display section is acquired is obtained.

Further, according to the first aspect, the controller may perform control for changing a definition of the image based on the acquired user information. Accordingly, an operation that the control for changing the image definition is performed based on the acquired user information is obtained.

Further, according to the first aspect, the controller may perform control for changing a display area of the image on the display section based on the acquired user information. Accordingly, an operation that the control for changing the display area of the image on the display section is performed based on the acquired user information is obtained.

Further, according to the first aspect, the controller may perform control for changing a size of the image on the display section based on the acquired user information. Accordingly, an operation that the control for changing the size of the image on the display section is performed based on the acquired user information is obtained.

Further, according to the first aspect, the acquisition section may acquire user information generated based on a focus point of a user in the image displayed on the display section. Accordingly, an operation that the user information generated based on the focus point of the user in the image displayed on the display section is acquired is obtained.

Further, according to the first aspect, the acquisition section may acquire the user information generated based on the user operation related to the image displayed on the display section. Accordingly, an operation that the user information generated based on the user operation related to the image displayed on the display section is acquired is obtained.

Further, according to the first aspect, the another information processing apparatus may further include the output section, the output section may output information based on the stream transmitted from the information processing apparatus, and the controller may perform the band control of the stream to be transmitted to the another information processing apparatus based on the acquired user information. Accordingly, an operation that the band control of the stream transmitted to the another information processing apparatus is performed based on the acquired user information is obtained.

Effect of the Invention

According to the present disclosure, it is possible to obtain an excellent effect that appropriate transmission band control can be performed.

BRIEF DESCRIPTION OF DRAWINGS

FIG. 23 A block diagram showing an example of a schematic structure of a car navigation apparatus.

MODES FOR CARRYING OUT THE INVENTION

Hereinafter, embodiments of the present disclosure will be described. The descriptions will be given in the following order.

1. First embodiment (Band control: Example where user information is acquired in reception-side information processing apparatus and band control is performed based on user information)

2. Second embodiment (Band control: Example where band control is performed based on user information when wireless communication is established across 3 information processing apparatuses)

3. Third embodiment (Band control: Example where user information is acquired in transmission-side information processing apparatus and band control is performed based on user information)

4. Fourth embodiment (Example where operation related to transmission apparatus and reception apparatus is performed with ease)

5. Application Example

<1. First Embodiment>
(Structural Example of Communication System)

Figure 1:
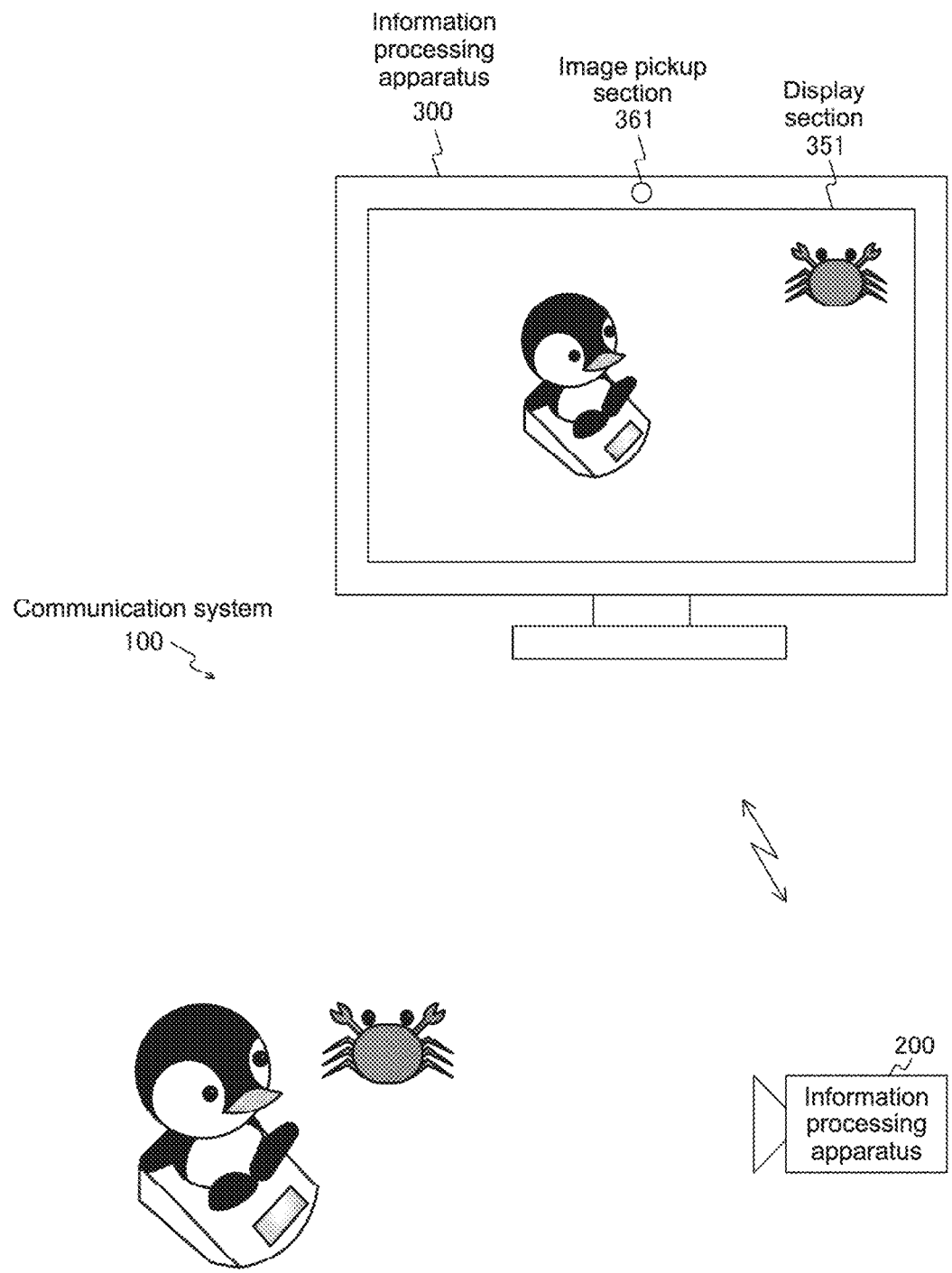
FIG. 1 A diagram showing a structural example of a communication system 100 according to a first embodiment of the present disclosure.

FIG. 1 is a diagram showing a structural example of a communication system 100 according to a first embodiment of the present disclosure. FIG. 1 shows an example of a system structure in a case where two information processing apparatuses (information processing apparatuses 200 and 300) are directly and wirelessly connected.

The communication system 100 includes information processing apparatuses 200 and 300. The information processing apparatus 200 is, for example, a transmission apparatus including a wireless communication function (e.g., electronic apparatus that transmits image (video) and audio via network). The information processing apparatus 300 is, for example, a reception apparatus including a wireless communication function (e.g., electronic apparatus that outputs image and audio received from network).

For example, the information processing apparatuses 200 and 300 are each a wireless communication apparatus conforming to an IEEE (Institute of Electrical and Electronics Engineers) 802.11 standard. In addition, the information processing apparatuses 200 and 300 are capable of exchanging various types of information using the wireless communication function.

Here, a wireless LAN (Local Area Network) can be used for the wireless communication used in the communication system 100, for example. As the wireless LAN, for example, Wi-Fi (Wireless Fidelity) Direct, TDLS (Tunneled Direct Link Setup), and an ad hoc network can be used. Moreover, Wi-Fi CERTIFIED Miracast can be used for near field wireless AV (Audio Visual) transmission communication used in the communication system 100, for example. It should be noted that Wi-Fi CERTIFIED Miracast is a mirroring technique for transmitting, using the techniques of Wi-Fi Direct and TDLS, audio and a display video reproduced in one terminal to another terminal and causing the other terminal to similarly output the audio and video data.

Also in Wi-Fi CERTIFIED Miracast, UIBC (User Input Back Channel) is realized on TCP-IP (Transmission Control Protocol/Internet Protocol). UIBC is a technique for transmitting operation information of an input apparatus such as a mouse and a keyboard from one terminal to another terminal. It should be noted that other remote desktop software (e.g., VNC (Virtual Network Computing)) is also applicable in place of Wi-Fi CERTIFIED Miracast.

The information processing apparatus 200 acquires, as well as photographing an object and generating image data, surrounding audio obtained when the image data is generated. Then, the information processing apparatus 200 transmits the generated image data and data related to the acquired audio (audio data) to the information processing apparatus 300. For example, in FIG. 1, the information processing apparatus 200 transmits, to the information processing apparatus 300, image data generated by the information processing apparatus 200 using a stuffed penguin and a stuffed crab as objects and data related to the audio (audio data) acquired when the data is generated. Then, the information processing apparatus 300 displays an image (stuffed penguin and stuffed crab) that is based on the image data transmitted from the information processing apparatus 200 on a display section 351. Further, the information processing apparatus 300 outputs, from an audio output section 352 (shown in FIG. 3), audio that is based on the audio data transmitted from the information processing apparatus 200. In this case, a user information acquisition section 360 (shown in FIG. 3) of the information processing apparatus 300 acquires information on a user (user information). For example, a face of a user is photographed by an image pickup section 361, image data is generated, and a user focus point is detected based on the image data.

It should be noted that the information processing apparatus 200 is, for example, an image pickup apparatus including a wireless communication function (e.g., digital still camera and digital video camera (e.g., camera-integrated recorder)). The information processing apparatus 300 is, for example, a display apparatus including a wireless communication function (e.g., television, projector, and personal computer) or a mobile information processing apparatus (e.g., smartphone and tablet terminal). It should be noted that although an image pickup apparatus including a wireless communication function is exemplified as the information processing apparatus 200 in FIG. 1, an electronic apparatus equipped with a camera (e.g., personal computer, game device, smartphone, and tablet terminal) may be used as the information processing apparatus 200. Moreover, although a display apparatus including a wireless communication function is exemplified as the information processing apparatus 300 in FIG. 1, an electronic apparatus equipped with a display section (e.g., image pickup apparatus, game device, smartphone, and tablet terminal) may be used as the information processing apparatus 300.

Here, for example, in Wi-Fi CERTIFIED Miracast, it is defined that an image (video) is to be compressed/developed using H.264. Further, in Wi-Fi CERTIFIED Miracast, for example, H.264 can be adjusted on a transmission side.

(Structural Example of Information Processing Apparatus (Transmission Side))

Figure 2:
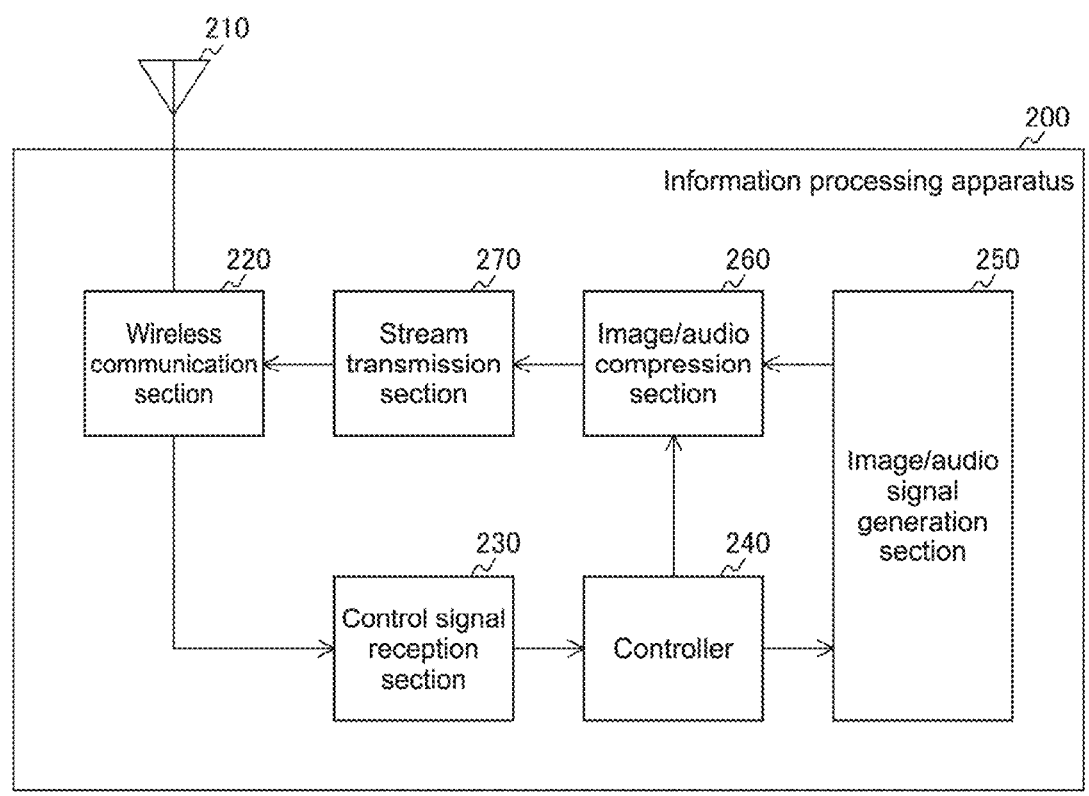
FIG. 2 A block diagram showing a functional structural example of an information processing apparatus 200 according to the first embodiment of the present disclosure.

FIG. 2 is a block diagram showing a functional structural example of the information processing apparatus 200 according to the first embodiment of the present disclosure.

The information processing apparatus 200 includes an antenna 210, a wireless communication section 220, a control signal reception section 230, a controller 240, an image/audio signal generation section 250, an image/audio compression section 260, and a stream transmission section 270.

The wireless communication section 220 transmits and receives, using wireless communication, various types of information (e.g., image data (video data) and audio data) to/from other information processing apparatuses (e.g., information processing apparatus 300) via the antenna 210. For example, when image data transmission processing is carried out, image data generated by the image/audio signal generation section 250 is compressed by the image/audio compression section 260, and the compressed image data (image stream) is transmitted from the antenna 210 via the wireless communication section 220.

The control signal reception section 230 acquires a control signal transmitted from another information processing apparatus (e.g., information processing apparatus 300) out of the information received by the wireless communication section 220 and outputs the acquired control signal to the controller 240.

The controller 240 performs control of the information transmitted from the information processing apparatus 200. For example, the controller 240 controls the image/audio signal generation section 250 and the image/audio compression section 260 based on the control signal received by the control signal reception section 230. For example, the controller 240 performs control for changing a definition of image data as a transmission target and control for changing an image area of image data as a transmission target. In other words, the controller 240 performs band control of a stream as the transmission target based on the control signal received by the control signal reception section 230.

Here, the band mainly refers to an occupancy rate of a communication path and also includes meanings of a communication speed and communication capacity. Further, the definition is an index of an image quality constituted of elements including a resolution (horizontal and vertical pixel count) of image data and a bit rate (compression rate) of image data. Furthermore, the definition is grasped as setting target information.

The image/audio signal generation section 250 generates data as an output target (image data and audio data) and outputs the generated data to the image/audio compression section 260. For example, the image/audio signal generation section 250 includes an image pickup section (not shown) and an audio acquisition section (not shown). The image pickup section (e.g., lens, image pickup device, and signal processing circuit) photographs an object and generates and image (image data). Further, the audio acquisition section (e.g., microphone) acquires surrounding audio obtained when the image data is generated. The data generated as described above becomes a transmission target with respect to the other information processing apparatus (e.g., information processing apparatus 300).

The image/audio compression section 260 compresses (encodes) the data generated by the image/audio signal generation section 250 (image data and audio data) under control of the controller 240. Then, the image/audio compression section 260 outputs the compressed data (image data and audio data) to the stream transmission section 270. It should be noted that the image/audio compression section 260 may be realized by executing encode by software or executing encode by hardware.

The stream transmission section 270 carries out transmission processing for transmitting, as a stream, the data compressed by the image/audio compression section 260 (image data and audio data) to the antenna 210 via the wireless communication section 220.

It should be noted that the information processing apparatus 200 may include a display section, an audio output section, and an operation reception section in addition to the sections described above, though illustrations thereof will be omitted in FIG. 2. Further, although a case where image data and audio data as transmission targets are generated is exemplified, the information processing apparatus 200 may acquire the image data and audio data as transmission targets from an external apparatus. For example, the information processing apparatus 200 may acquire the image data and audio data as transmission targets from a Web camera with a built-in microphone.

The display section (not shown) is a display section that displays an image generated by the image/audio signal generation section 250, for example. It should be noted that as the display section, for example, a display panel of an organic EL (Electro Luminescence), LCD (Liquid Crystal Display), and the like can be used.

The audio output section (not shown) is an audio output section (e.g., speaker) that outputs audio generated by the image/audio signal generation section 250, for example. It should be noted that an image may be output from both the transmission apparatus and the reception apparatus, but it is favorable to output audio from one of the apparatuses.

The operation reception section (not shown) is an operation reception section that receives an operation input made by the user and is, for example, a keyboard, a mouse, a game pad, a touch panel, a camera, and a microphone. It should be noted that the operation reception section and the display section may be integrated using a touch panel with which an operation input can be made by the user placing his/her finger on or in close contact with a display surface thereof.

(Structural Example of Information Processing Apparatus (Reception Side))

Figure 3:
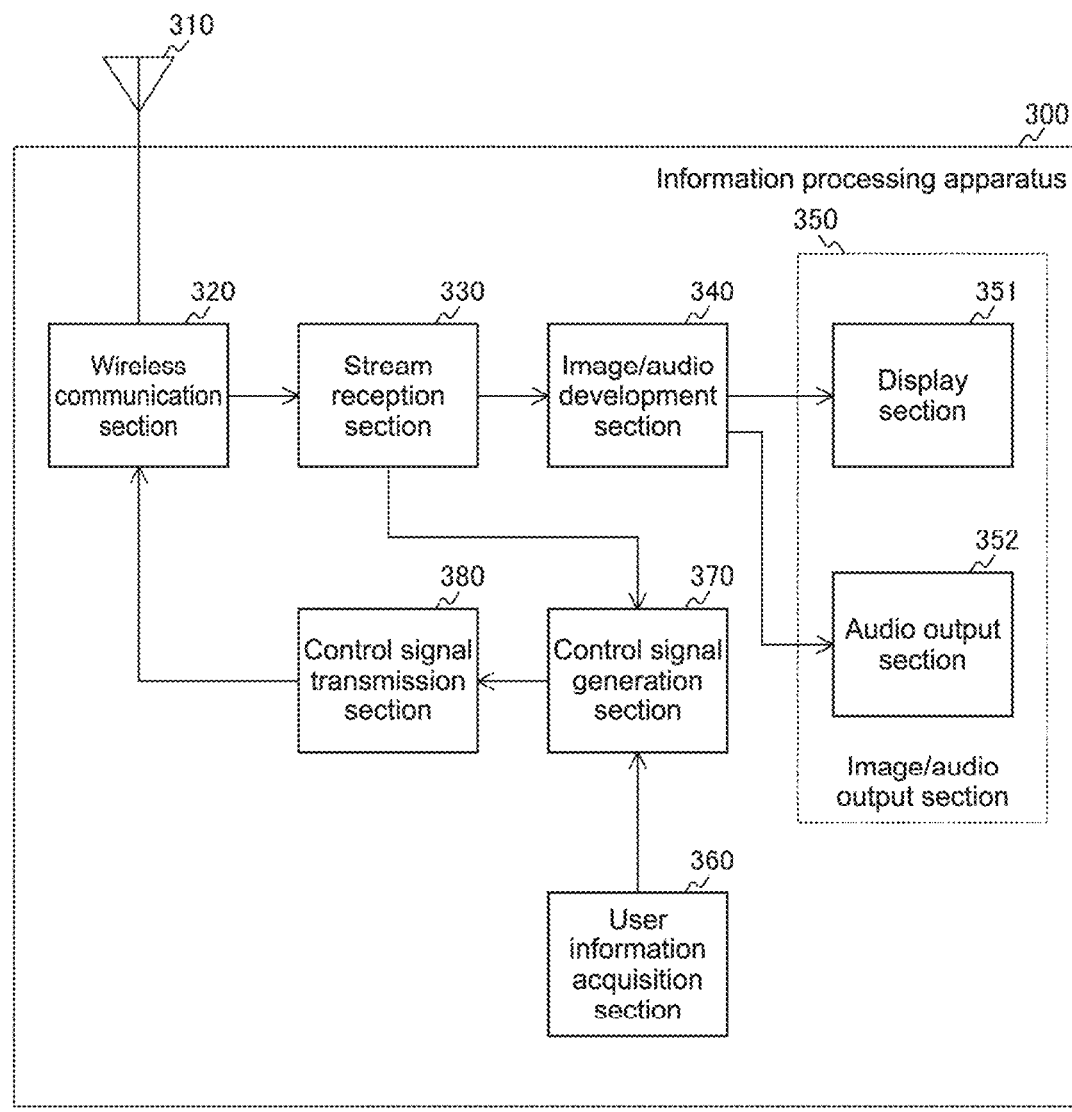
FIG. 3 A block diagram showing a functional structural example of an information processing apparatus 300 according to the first embodiment of the present disclosure.

FIG. 3 is a block diagram showing a functional structural example of the information processing apparatus 300 according to the embodiment of the present disclosure.

The information processing apparatus 300 includes an antenna 310, a wireless communication section 320, a stream reception section 330, an image/audio development section 340, an image/audio output section 350, a user information acquisition section 360, a control signal generation section 370, and a control signal transmission section 380.

Using wireless communication, the wireless communication section 320 transmits and receives information (e.g., image data and audio data) to and from other information processing apparatuses (e.g., information processing apparatus 200) via the antenna 310. For example, when image data reception processing is carried out, image data received by the antenna 310 is developed (decoded) by the image/audio development section 340 via the wireless communication section 320 and the stream reception section 330. Then, the developed image data is supplied to the image/audio output section 350 so that an image corresponding to the developed image data is output from the image/audio output section 350. In other words, the image corresponding to the developed image data is displayed on the display section 351.

The stream reception section 330 receives a stream (image stream (video stream) and audio stream) out of the information received by the wireless communication section 320 and outputs the received stream to the image/audio development section 340 and the control signal generation section 370.

The image/audio development section 340 develops (decodes) the data (stream (image data and audio data)) transmitted from the other information processing apparatus (e.g., information processing apparatus 200). Then, the image/audio development section 340 outputs the developed data (image data and audio data) to the image/audio output section 350. It should be noted that the image/audio development section 340 may be realized by executing decode by software or executing decode by hardware.

The image/audio output section 350 includes the display section 351 and the audio output section 352.

The display section 351 is a display section that displays images based on the image data developed by the image/audio development section 340 (e.g., display screen shown in FIG. 1). It should be noted that as the display section 351, a display panel such as an organic EL panel and an LCD panel can be used. It should be noted that a touch panel with which an operation input can be made by the user placing his/her finger on or in close contact with a display surface thereof may also be used as the display section 351.

The audio output section 352 is an audio output section (e.g., speaker) that outputs various types of audio based on audio data developed by the image/audio development section 340 (e.g., audio related to image displayed on display section 351).

The user information acquisition section 360 acquires information on a user (user information) and outputs the acquired user information to the control signal generation section 370. For example, the user information acquisition section 360 includes the image pickup section 361 (shown in FIG. 1), a face detection section, a pupil detection section, an operation reception section (keyboard, mouse, remote controller, game pad, and touch panel), a microphone, and various sensors (e.g., gyro sensor and sensor that senses human body). The user information acquisition section 360 acquires user information by those sections. It should be noted that the operation reception section is an operation reception section for designating an arbitrary area of an image displayed on the display section 351, for example.

For example, the user information acquisition section 360 acquires user information generated by a user operation when information that is based on a stream received from the other information processing apparatus (e.g., information processing apparatus 200) is output from the image/audio output section 350 via wireless communication. The user information is user information generated by a user operation related to the image displayed on the display section 351, for example. For example, the user information is user information generated based on a user focus point in the image displayed on the display section 351. Moreover, for example, the user information is information generated based on a user operation related to the image displayed on the display section 351. It should be noted that the user information acquisition section 360 is an example of the acquisition section described in the claims.

The control signal generation section 370 performs band control of the stream transmitted from the other information processing apparatus (e.g., information processing apparatus 200) based on the user information output from the user information acquisition section 360. Specifically, the control signal generation section 370 generates a control signal for performing stream band control based on the user information output from the user information acquisition section 360 and outputs the generated control signal to the control signal transmission section 380. For example, the control signal generation section 370 generates a control signal for changing a definition of the image displayed on the display section 351 based on the user information output from the user information acquisition section 360. Alternatively, for example, the control signal generation section 370 generates a control signal for changing a display area of the image displayed on the display section 351 based on the user information output from the user information acquisition section 360. Alternatively, for example, the control signal generation section 370 generates a control signal for changing a size of the image displayed on the display section 351 based on the user information output from the user information acquisition section 360. It should be noted that the control signal generation section 370 is an example of the controller described in the claims.

The control signal transmission section 380 carries out transmission processing for transmitting the control signal output from the control signal generation section 370 to the other wireless communication apparatus via the wireless communication section 320 and the antenna 310.

(Focus Point Detection Example)

Figure 4:
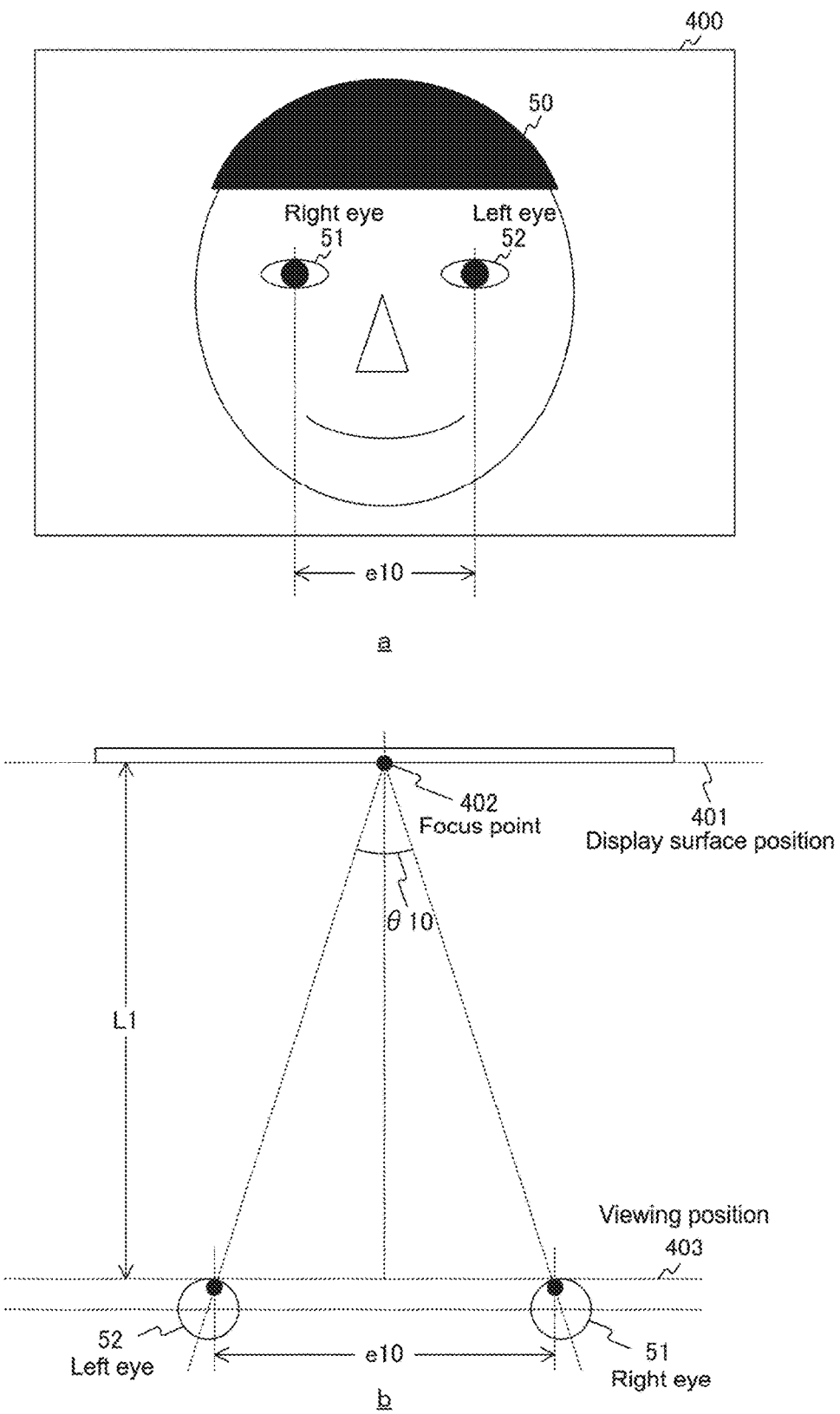
FIG. 4 Diagrams schematically showing an example of a detection method of a focus point of a user by a user information acquisition section 360 according to the first embodiment of the present disclosure.
Figure 5:
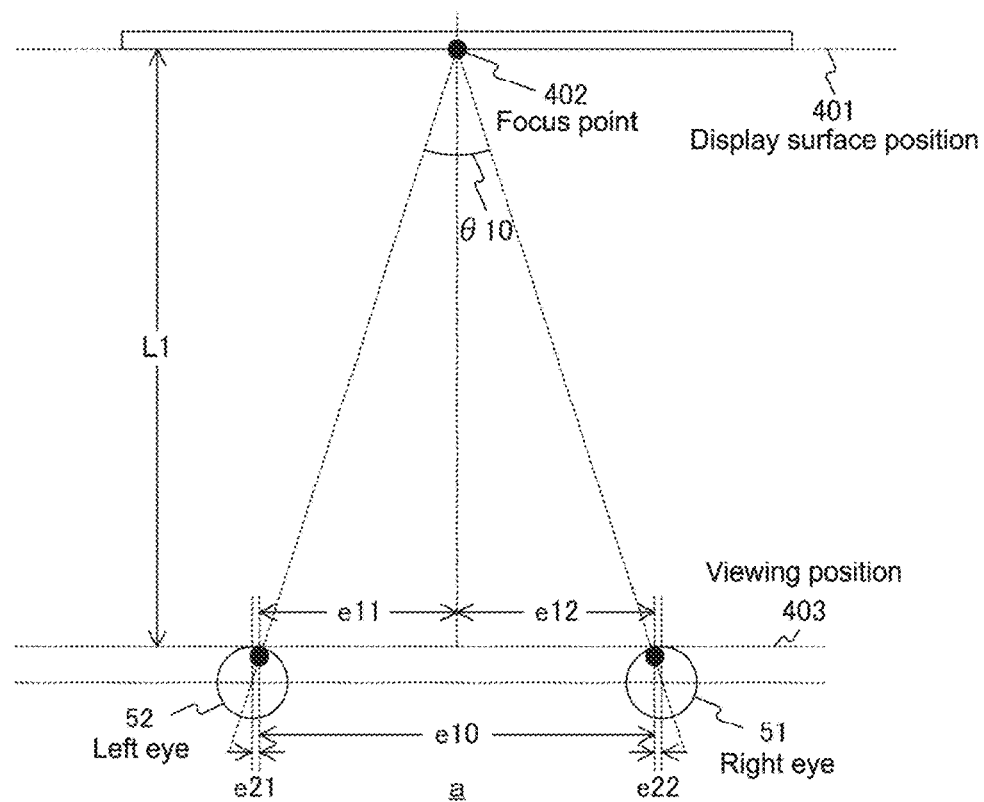
FIG. 5 Diagrams schematically showing an example of the detection method of a focus point of a user by the user information acquisition section 360 according to the first embodiment of the present disclosure.
Figure 5:
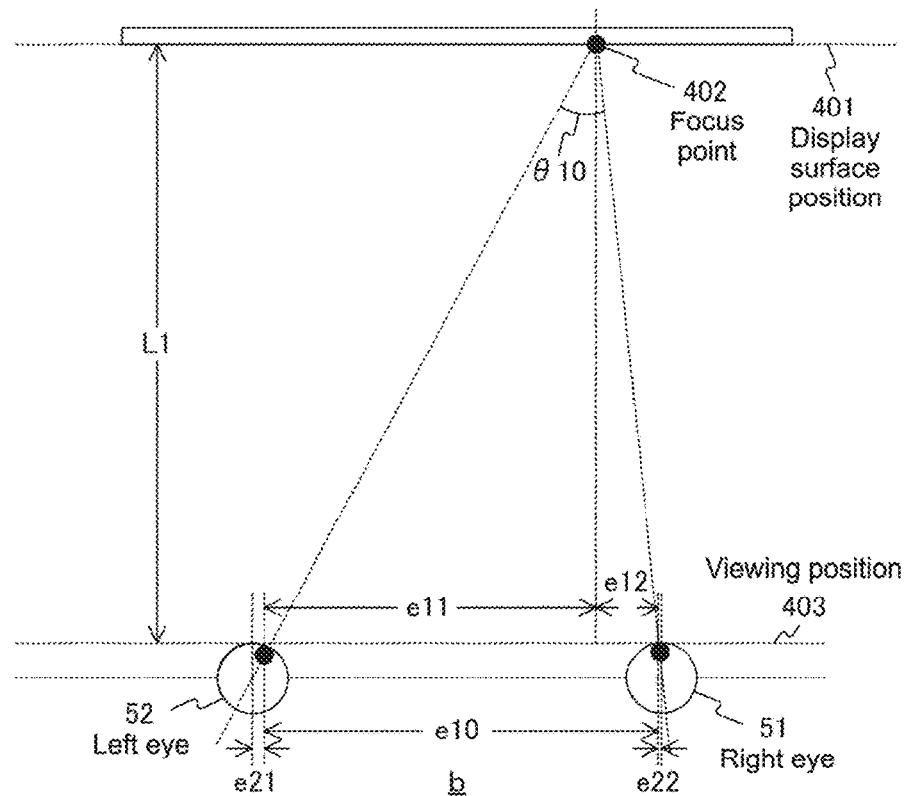

FIGS. 4 and 5 are diagrams schematically showing an example of a detection method of a focus point of a user by the user information acquisition section 360 according to the first embodiment of the present disclosure.

FIG. 4A shows an image generated by the user information acquisition section 360 (image 400) in a simplified form. The image 400 is an example of an image generated by the image pickup section 361 (image data) and includes, for example, a face of a user 50 in front of the information processing apparatus 300 shown in FIG. 1. It should be noted that the face of the user 50 included in the image 400 is detected by the face detection section (not shown). Moreover, both eyes (right eye 51 and left eye 52) of the user 50 included in the image 400 are detected by the pupil detection section (not shown).

The face detection section detects a face of a person included in the image data generated by the image pickup section 361. As the face detection method, for example, a face detection method involving matching using a template recorded with face luminance distribution information and an actual image (see, for example, Japanese Patent Application Laid-open No. 2004-133637), a face detection method that is based on a skin color part, a facial feature amount of a human being, and the like included in the image data, or the like can be used. Moreover, face detection information includes a position and size of a detected face on the image data (image). It should be noted that the position of the detected face on the image data may be an upper left position of a face image on the image data, and the size of the detected face on the image data may be horizontal and vertical lengths of the face image on the image data, for example. By the face detection information, a face image as rectangular image data including at least a part of the face on the image data can be identified.

The pupil detection section detects pupils from both eyes of the face included in the image data output from the image pickup section 361. Specifically, the pupil detection section uses the face detection information (position and size) output from the face detection section to extract a face image corresponding to the face detected by the face detection section from the image data output from the image pickup section 361. Then, pupils are detected from the extracted face image. As the pupil detection method, for example, a pupil detection method involving matching using a template recorded with pupil luminance distribution information and an actual image can be used as in the face detection method. Moreover, pupil information includes positions of the detected pupils in the face image. By the pupil information, positions of the pupils of both eyes on the image data can be identified. The pupil positions may be set as center positions of the pupils, for example.

Further, the embodiment of the present disclosure uses an example where a center position of a pupil of a left eye is used as a position of the pupil of the left eye, and a center position of a pupil of a right eye is used as a position of the pupil of the right eye. Furthermore, the embodiment of the present disclosure uses an example where a distance between the center position of the pupil of the left eye and the center position of the pupil of the right eye is referred to as pupil interval. Specifically, in the example shown in FIG. 4, a distance between the center position of the pupil of the left eye 52 and the center position of the pupil of the right eye 51 becomes the pupil interval (value corresponding to actual pupil interval $e10$; thus virtually indicated as "$e10$" in FIG. 4). It should be noted that the pupil interval $e10$ can be calculated based on an object distance (distance between lens and face of user 50), a distance between a lens and the image pickup device in the image pickup section 361, and a value of the interval of the pupils to be imaged on an imaging surface of the image pickup device, for example. Further, a fixed value (e.g., 65 mm) may be used as the pupil interval $e10$.

FIG. 4B schematically shows a relationship between a viewing position of the image displayed on the display section 351 and both eyes (right eye 51 and left eye 52) of the user 50 viewing the image.

Specifically, eyeballs of the user viewing the image and a congestion angle $\theta 10$ corresponding thereto are shown. In FIG. 4B, the position at which the image is shown (display surface of display section 351) is set as a display screen position 401, and a viewing position of the user viewing the image displayed on the display section 351 is set as a viewing position 403.

For example, when the user views the image displayed at the display screen position 401, angles of the eyeballs of the user in the horizontal direction are adjusted and focal points of both eyes are adjusted at the display screen position 401 so as to coincide with the position of the image that the user is focusing on. Specifically, the angles of the eyeballs of the user in the horizontal direction are adjusted so that an intersection (focus point 402) of straight lines connecting each of the pupils of both eyes (right eye 51 and left eye 52) of the user and the display screen position 401 coincides with the position of the image that the user is focusing on. Moreover, as well as the angle, the focal points of both eyes are adjusted at the display screen position 401 (focus point 402). It should be noted that the angle $\theta 10$ of the focus point 402 is generally referred to as congestion angle. As described above, when the user views the image displayed at the display screen position 401, both the focal points and viewpoints of both eyes of the user (right eye 51 and left eye 52) are present at the display screen position 401.

Here, a calculation method of the congestion angle θ10 will be described. For example, a distance between the display screen position 401 and the viewing position 403 is set as L1, and an eye interval of the user viewing the image is set as e10. In this case, the following Expression 1 is established.

$$\tan(\theta 10/2) = (e10/2)/L1 \qquad \text{Expression 1}$$

In addition, the congestion angle θ10 can be obtained by the following Expression 2.

$$\theta 10 = 2\tan^{-1}((e10/2)/L1) \qquad \text{Expression 2}$$

It should be noted that as the distance L1, the object distance output from the image pickup section 361 can be used. Moreover, as the distance L1, a fixed value assuming a viewing position (e.g., 2 m) may be used, or the distance L1 may be acquired by a manual input of the user. Further, the distance L1 may be acquired by other distance measurement methods. For example, a distance measurement method for measuring the distance L1, that involves providing a UWB (Ultra Wide Band) in a remote controller to be held in a hand of the user and using a position measurement function of the UWB, may be used. Furthermore, the distance L1 may be measured using a distance measurement apparatus that measures a distance based on infrared rays, ultrasonic waves, and the like.

FIGS. 5A and 5B show a relationship among distances (distances in horizontal direction) e11 and e12 between the focus point 402 and the center positions of the pupils of both eyes and distances (distances in horizontal direction) e21 and e22 between the center positions of eyeballs of the user and the center positions of the pupils of both eyes.

Here, a sum value of e11, e12, e21, and e22 is constant. Further, e12/e11=e22/e21 is established. In this regard, for example, a position of the focus point 402 at which e11=e12 is established is set first. Subsequently, the distances e21 and e22 are calculated when the center positions of the pupils of both eyes move, and the moved position of the focus point 402 can be calculated based on the relationship among the distances e21 and e22 and the distances e11 and e12.

Also the position of the focus point 402 in the vertical direction can be calculated using a distance (distance in vertical direction) between the center position of the eyeballs of the user and the center positions of the pupils of both eyes.

In this example, the position of the focus point is calculated based on the relationship among the distances between the focus point and the center positions of the pupils of both eyes and the distances between the center points of the eyeballs of the user and the center positions of the pupils of both eyes. It should be noted that the position of the focus point may be detected by other methods. For example, the position of the focus point can be detected by an eye tracking (sight line analysis) method.

(User Focus Degree Calculation Example)

Figure 6:
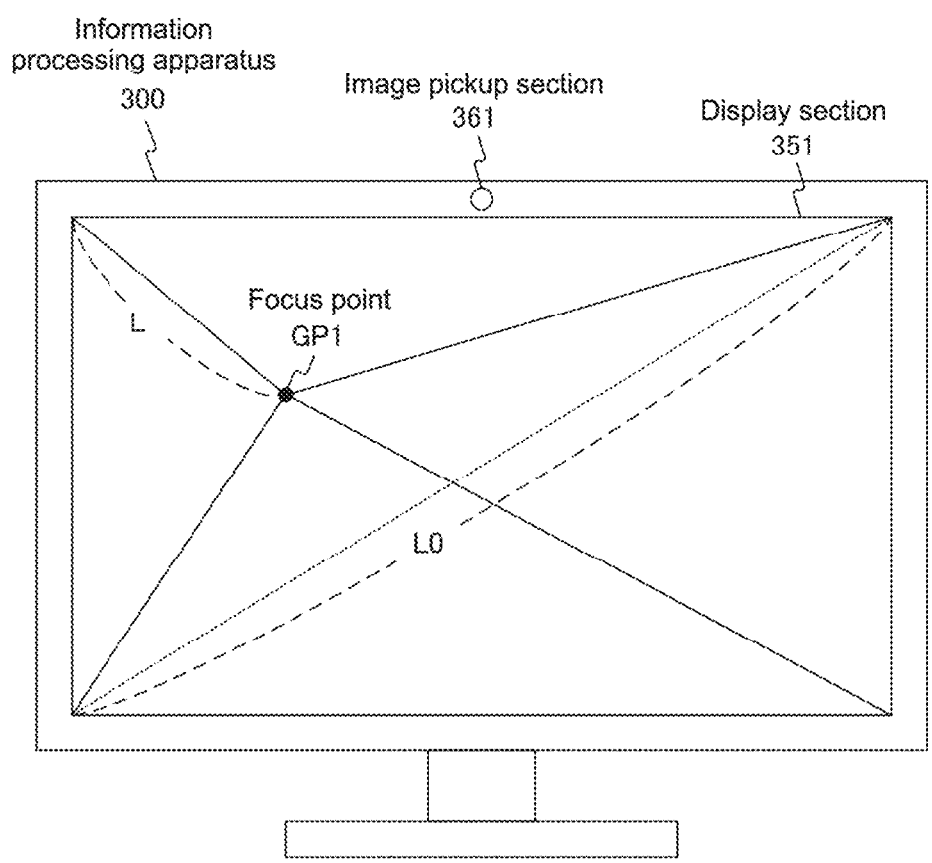
FIG. 6 A diagram schematically showing an example of a calculation method of a focus degree of a user by a control signal generation section 370 according to the first embodiment of the present disclosure.

FIG. 6 is a diagram schematically showing an example of a calculation method of a focus degree of a user by the control signal generation section 370 according to the first embodiment of the present disclosure.

Here, a stream corresponding to an image displayed on the display section 351 of the reception-side information processing apparatus 300 (i.e., image/audio stream being received) is represented by sn (note that n is a positive integer), and a user focus degree with respect to the stream sn is represented by αsn. It should be noted that the stream sn refers to a stream corresponding to one period during which no setting change (e.g., setting change of definition and setting change of area) is made. For example, a stream to be a first transmission target may be set as s1, a stream to be transmitted right after the first setting change is made may be set as s2, and a stream to be transmitted right after the next setting change is made may be set as s3.

The user focus degree αsn can be calculated based on the user focus point and the position on the display screen at which the user makes an operation. Specifically, the user focus degree αsn can be calculated by the following Expression 3.

$$\alpha sn = G1 + D1 \qquad \text{Expression 3}$$

Here, G1 is a value indicating a focus degree of the focus, and D1 is a value indicating a focus degree regarding an operation.

Here, a calculation method of the focus degree G1 of the focus will be described.

As shown in FIG. 6, for example, the user information acquisition section 360 obtains a user focus point GP1 on the display screen of the display section 351. Moreover, the control signal generation section 370 stores user information acquired by the user information acquisition section 360 (trajectory of user focus point GP1) for a predetermined time (e.g., last 10 seconds from current time). Then, the control signal generation section 370 uses the following Expression 4 to calculate the focus degree G1 of the focus.

$$G1 = 2L/L0 \qquad \text{Expression 4}$$

Here, as shown in FIG. 6, L represents a value indicating a shortest distance out of distances between 4 apexes of the display screen of the display section 351 and the trajectory of the user focus point GP1 for a most recent predetermined time (e.g., 10 seconds). Moreover, L0 represents a value indicating a length of a diagonal line of the display screen of the display section 351.

Next, a calculation method of the focus degree D1 regarding an operation will be described.

Using the following Expression 5, the control signal generation section 370 calculates the focus degree D1 regarding an operation based on the user information acquired by the user information acquisition section 360 (trajectory of user focus point GP1).

$$D1 = t1 * r \qquad \text{Expression 5}$$

Here, t1 represents a value indicating a total time the user makes an operation within the most recent predetermined time (e.g., 10 seconds) regarding the image displayed on the display section 351 (image corresponding to image stream sn). Further, r represents a value indicating a specific gravity of the focus and operation, that the user is capable of setting. It should be noted that either a fixed value (e.g., 1) or a variable value may be used as r. For example, when there are a plurality of types of input operation apparatuses (e.g., mouse, remote controller, and touch panel), r may take a variable value. In this case, for example, the value of r is set based on the type of the input operation apparatus used for the operation. For example, r1 is set as r of a mouse, r2 is set as r of a remote controller, and r3 is set as r of a touch panel.

Using the user focus degree αsn calculated as described above, the control signal generation section 370 determines whether to raise or lower the definition. Then, the control signal generation section 370 generates a control signal for making a request corresponding to the user focus degree αsn. Then, the control signal transmission section 380 transmits the generated control signal to the information processing apparatus 200 via the wireless communication section 320 and the antenna 310.

For example, a threshold value of a focus degree sufficient to make the definition higher is set as q, and a threshold value of a focus degree requisite for maintaining the definition that is currently being received is set as p (note that p<q). As a result, the control signal generation section 370 can determine whether to raise or lower the definition based on a comparison result of the user focus degree αsn and the threshold values p and q, for example.

Specifically, when there is a change in the operation or intention of the user who is operating or viewing, the control signal generation section 370 calculates the user focus degree αsn corresponding to the image/audio stream sn being received. It should be noted that when there is a change in the operation or intention of the user who is operating or viewing, for example, there is a change in the user information acquired by the user information acquisition section 360. Then, when the user focus degree αsn is larger than the threshold value q (i.e., αsn>q), it can be determined that the user focus degree αsn with respect to the image/audio stream sn being received is especially high. Therefore, the control signal generation section 370 generates a control signal regarding a change request for raising the definition of the image/audio stream sn being received. Then, the control signal transmission section 380 transmits the generated control signal to the information processing apparatus 200 via the wireless communication section 320 and the antenna 310.

On the other hand, when the user focus degree αsn is smaller than the threshold value p (i.e., αsn<p), it can be determined that the user focus degree αsn with respect to the image/audio stream sn being received is especially low. Therefore, the control signal generation section 370 generates a control signal regarding a change request for lowering the definition of the image/audio stream sn being received. Then, the control signal transmission section 380 transmits the generated control signal to the information processing apparatus 200 via the wireless communication section 320 and the antenna 310.

Further, when the user focus degree αsn is 0 (i.e., αsn=0), it can be determined that the user focus degree αsn with respect to the image/audio stream sn being received is absolutely 0. Therefore, the control signal generation section 370 generates a control signal regarding a transmission stop request of the image/audio stream sn being received. Then, the control signal transmission section 380 transmits the generated control signal to the information processing apparatus 200 via the wireless communication section 320 and the antenna 310.

Figure 7:
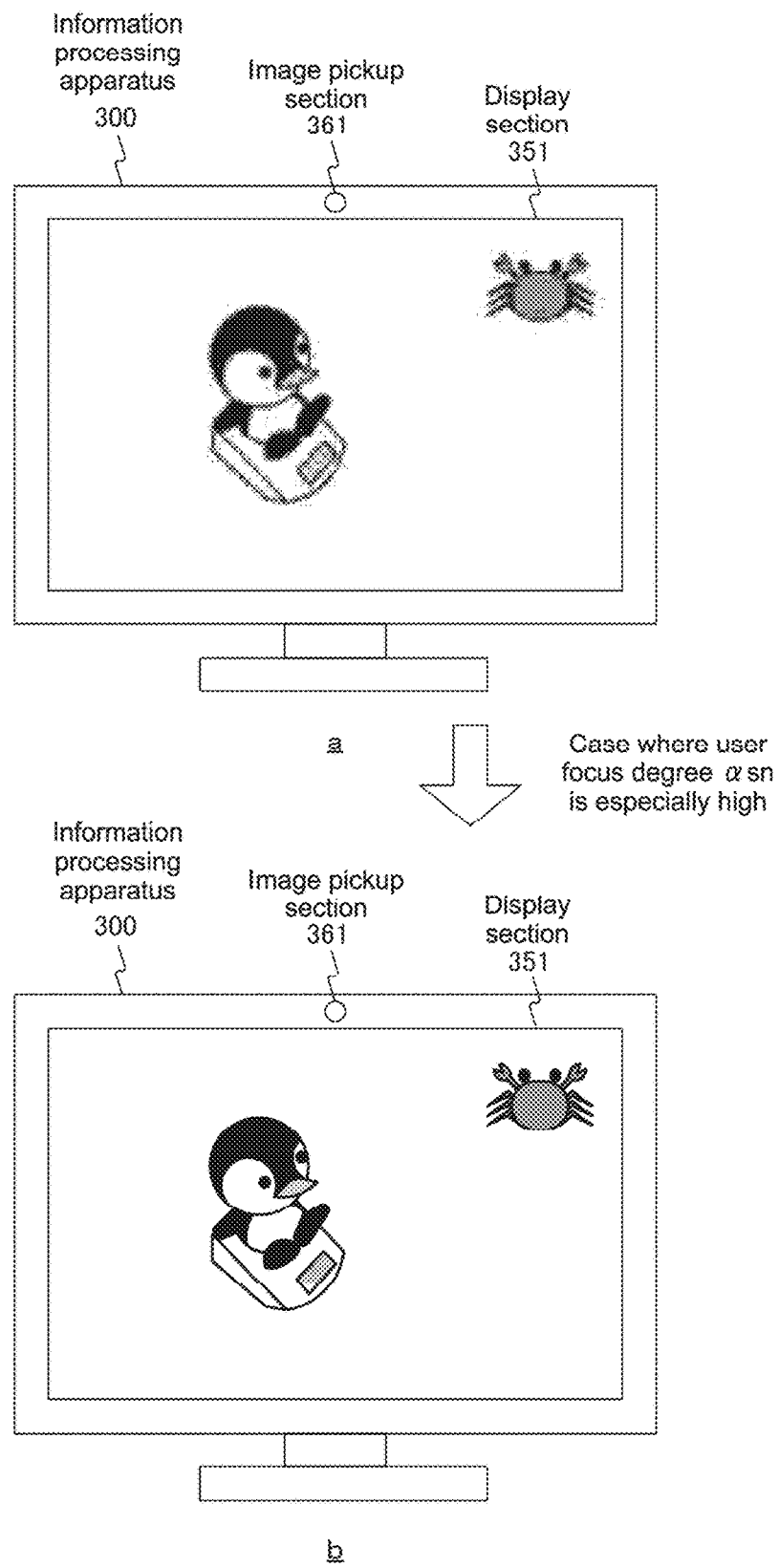
FIG. 7 Diagrams showing a transition example of an image displayed on a display section 351 according to the first embodiment of the present disclosure.

When the control signal transmitted as described above is received by the transmission-side information processing apparatus 200, the controller 240 of the transmission-side information processing apparatus 200 performs control for changing a data amount of the data to be the transmission target (image data and audio data). For example, when a control signal regarding a change request for raising the definition of the image/audio stream sn being received is received, the controller 240 raises the data amount of the data (image data and audio data) to be the transmission target. In this case, the reception-side information processing apparatus 300 performs image display based on the image data received from the transmission-side information processing apparatus 200 according to the raise of the data amount. In other words, when the user focus degree αsn with respect to the image/audio stream sn being received is especially high, it is possible to cause the definition of the image that is based on the image data received from the transmission-side information processing apparatus 200 to be raised for display. In this case, no change is made on the display area. The display transition example in this case is shown in FIG. 7. Further, the audio data may also be made high-quality sound.

Here, for example, a case where a resolution of the display section 351 (e.g., liquid crystal panel resolution) is 1920*1080 dots, a resolution of original image data is 640*360 dots, and a bit rate of the original image data is 2 Mbps will be discussed. In this case, an expansion corresponding to compressed data of 2 Mbps is performed on the original image data, and the thus-expanded image is triply enlarged and displayed. Further, a case where a resolution of image data (image data with increased data amount) transmitted based on a change request for changing a definition is 1920*1080 dots and a bit rate of the image data is 12 Mbps will be discussed. In this case, an expansion corresponding to compressed data of 12 Mbps is performed on the image data transmitted based on the change request for raising the definition, and the thus-expanded image is displayed as it is.

Further, for example, when a control signal regarding a change request for lowering the definition of the image/audio stream sn being received is received, the controller 240 of the transmission-side information processing apparatus 200 lowers the data amount of the data to be the transmission target (image data and audio data). In this case, the reception-side information processing apparatus 300 displays an image based on the image data received from the transmission-side information processing apparatus 200 according to the lowering of the data amount. Specifically, when the user focus degree αsn with respect to the image/audio stream sn being received is especially low, the definition of the image that is based on the image data received from the transmission-side information processing apparatus 200 can be lowered for display. Moreover, the image quality of the image that is based on the image data received from the transmission-side information processing apparatus 200 can be lowered for display. Furthermore, the audio data can also be made low quality sound.

Further, for example, when a control signal regarding a transmission stop request of the image/audio stream sn being received is received, the controller 240 of the transmission-side information processing apparatus 200 stops transmitting the data (image data and audio data).

Here, when the user focus degree αsn is equal to or larger than the threshold value p and equal to or smaller than the threshold value q (i.e., p≤αsn≤q), it can be determined that there is not much change in the user focus degree αsn with respect to the image/audio stream sn being received. In this case, it is favorable to continue receiving the image/audio stream sn being received. Therefore, the control signal generation section 370 does not generate a control signal for making a request regarding the image/audio stream sn being received.

Here, fixed values may be used as the threshold values p and q, or values thereof may be varied by a user operation.

For example, when a predetermined time used for calculating the focus degree D1 regarding an operation is 10 seconds and r is a fixed value (r=1), 0≤D1≤10 is established. In this case, since the focus degree G1 of the focus is equal to or lower than 1 (i.e., G1≤1), the user focus degree αsn may take the following values.

$$0 \le \alpha sn \le 11$$

In this case, for example, the threshold value p can be set to 0.5, and the threshold value q can be set to 3.

(Display Transition Example)

FIG. 7 are diagrams showing a transition example of an image displayed on the display section 351 according to the first embodiment of the present disclosure. FIG. 7 show a display transition example in a case where the user focus degree αsn is larger than the threshold value q as described above.

The display content shown in FIG. 7A is the same as that shown in FIG. 1. It should be noted that in FIG. 7A, for brevity of description, the definition of the image displayed on the display section 351 is lowered. FIG. 7B shows a display example of the image displayed based on the image data received from the transmission-side information processing apparatus 200. For example, the definition of the image shown in FIG. 7A is raised. In this case, the image may be enlarged for display according to the raise of the definition.

(Calculation Example of Focus Position Change Vector)

Figure 8:
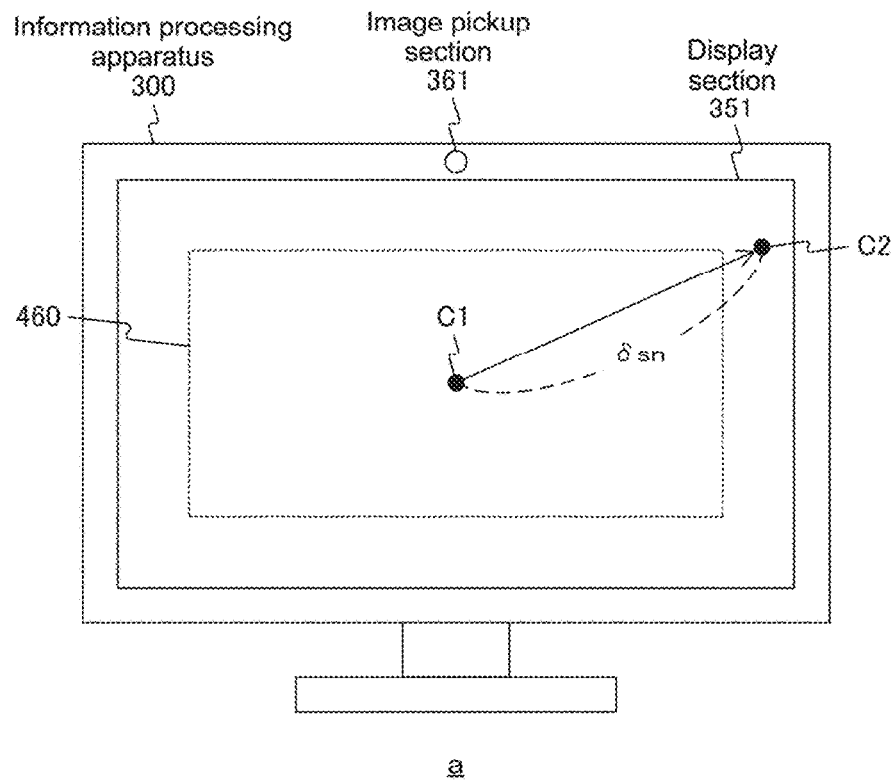
FIG. 8 Diagrams schematically showing an example of a calculation method of a change vector of a focus position of the user by the control signal generation section 370 according to the first embodiment of the present disclosure.
Figure 8:
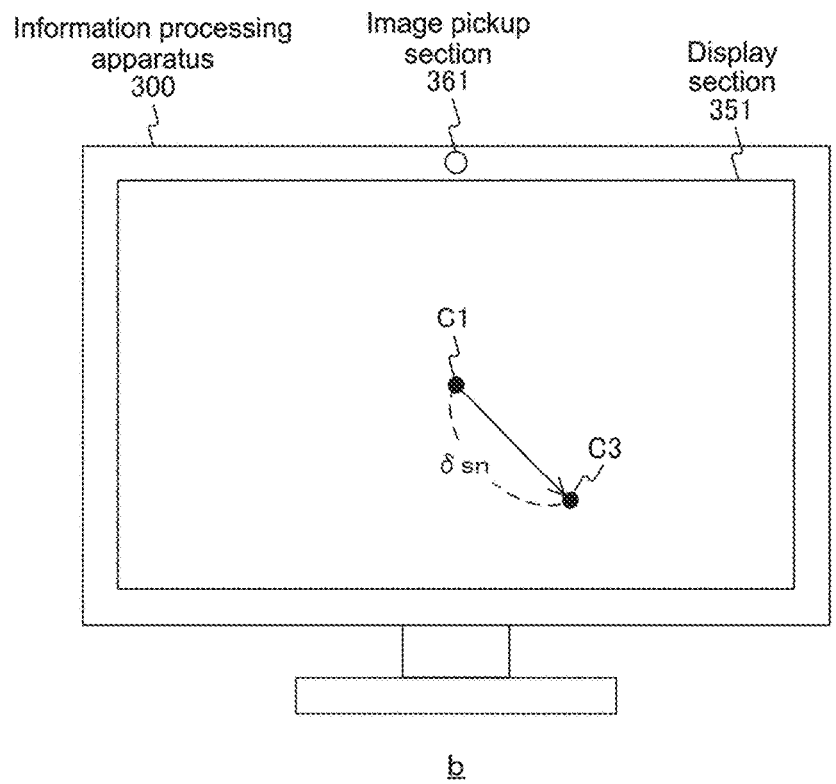

FIG. 8 are diagrams schematically showing an example of a calculation method of a change vector of a focus position of the user by the control signal generation section 370 according to the first embodiment of the present disclosure.

Here, a change vector of the user focus position with respect to a stream (i.e., image/audio stream being received) sn corresponding to an image displayed on the display section 351 of the reception-side information processing apparatus 300 is represented by δsn. For example, the user focus position change vector δsn is a vector that indicates a change in the user focus degree with respect to the display surface of the display section 351 of the information processing apparatus 300. For example, the user focus position change vector δsn corresponds to a change amount (user focus position change amount) from a center position of an image displayed on the display section 351.

For example, the user focus position change vector δsn can be calculated based on the user focus point or a position on the display screen where the user makes an operation. FIG. 8A shows an example of calculating the user focus position change vector δsn based on the user focus point. Further, FIG. 8B shows an example of calculating the user focus position change vector δsn based on the position on the display screen where the user makes an operation.

First, a calculation method of calculating the user focus position change vector δsn based on the user focus point will be described. For example, as shown in FIG. 8A, an area 460 (rectangle in dotted line) that is 70% of the area from the center C1 of the display screen is set. In this case, the direction and distance from the center C1 to the user focus point C2 in a case where the user focus point C2 is outside the area 460 can be set as δsn. It should be noted that the area 460 may either be fixed or be variable. For example, while the image area is changed, the area 460 may become variable so as to be enlarged. Moreover, the area 460 may take shapes other than a rectangle.

Here, it can also be assumed that the user focus point will move frequently. In this regard, when calculating the user focus position change vector δsn based on the user focus point, a large deviation from the center C1 of the display screen can be set as the calculation condition.

Next, a calculation method of calculating the user focus position change vector δsn based on the position on the display screen where the user makes an operation will be described. For example, as shown in FIG. 8B, the direction and distance from the center C1 of the display screen to a position C3 as a center point of an operation made by the user can be set as δsn. It should be noted that an operation made by the user refers to, for example, enlargement/contraction/slide operations on a touch panel, an area selection using a mouse or a remote controller, and a letter input using a keyboard.

Using the user focus position change vector δsn calculated as described above, the control signal generation section 370 can change coordinates of an image (i.e., image area) according to that change. Specifically, the control signal generation section 370 generates a control signal for making a request corresponding to the user focus position change vector δsn. Then, the control signal transmission section 380 transmits the generated control signal to the information processing apparatus 200 via the wireless communication section 320 and the antenna 310.

Specifically, when there is a change in the operation or intention of the user who is operating or viewing, the control signal generation section 370 calculates the user focus position change vector δsn corresponding to the image/audio stream sn being received. Then, when the user focus position change vector δsn satisfies a predetermined condition, the control signal generation section 370 generates a control signal regarding a change request for changing an image area of an image corresponding to the image/audio stream sn being received. For example, a control signal regarding a change request for changing the image coordinates (i.e., image area change) only by an amount corresponding to the user focus position change vector δsn is generated. Then, the control signal transmission section 380 transmits the generated control signal to the information processing apparatus 200 via the wireless communication section 320 and the antenna 310.

Here, a case where the user focus position change vector δsn satisfies a predetermined condition is a case where the change vector δsn is equal to or larger than a threshold value, for example. In addition, the case where the user focus position change vector δsn satisfies a predetermined condition is a case where the user makes an operation or focuses on a specific area of the display screen on which the image/audio stream sn being received is displayed.

Figure 9:
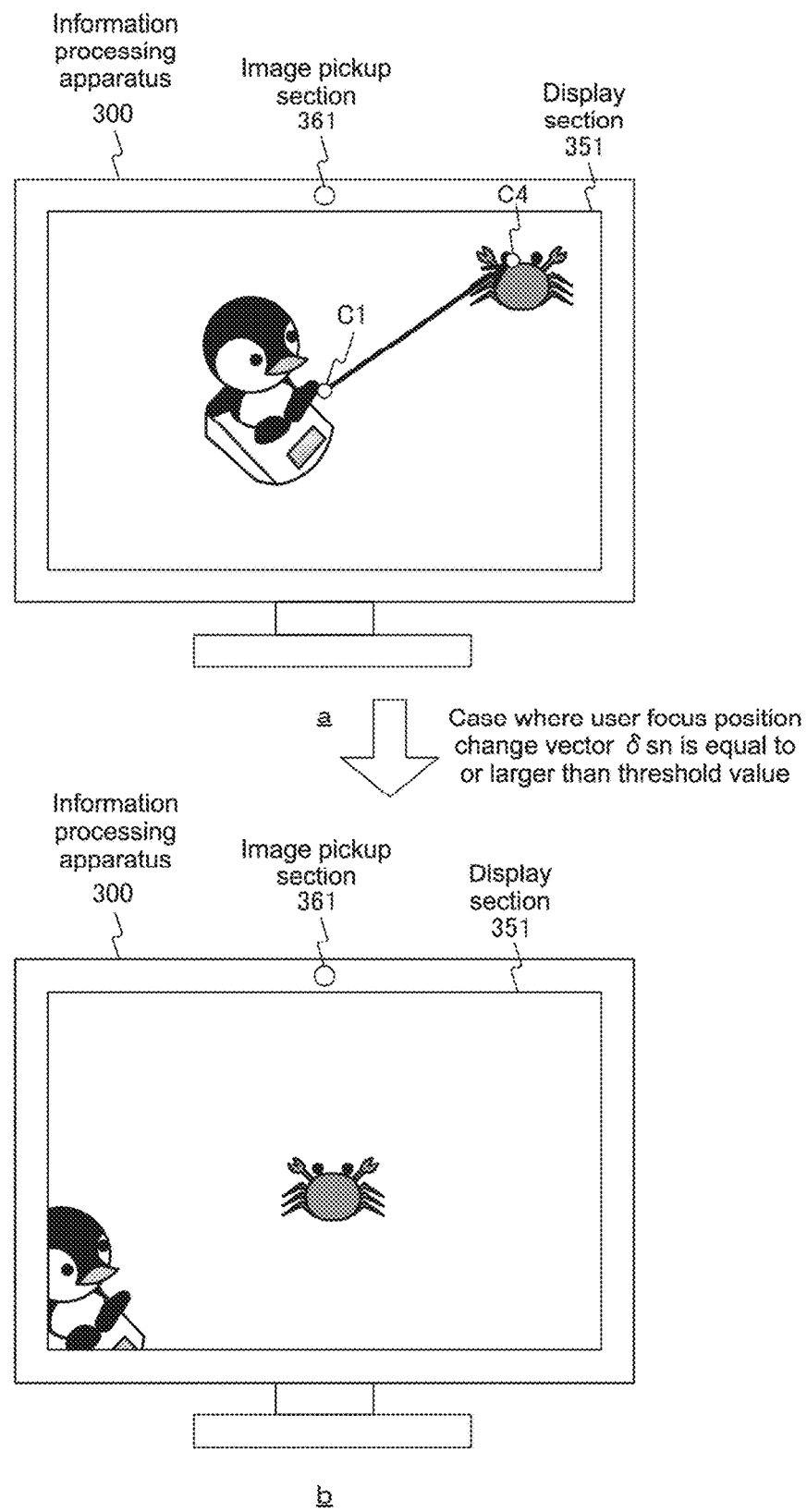
FIG. 9 Diagrams showing a transition example of an image displayed on the display section 351 according to the first embodiment of the present disclosure.

When the control signal transmitted as described above is received by the transmission-side information processing apparatus 200, the controller 240 of the transmission-side information processing apparatus 200 performs control for changing an image area of an image corresponding to the data as the transmission target (image data and audio data). For example, the controller 240 moves the image area of the image corresponding to the data as the transmission target (image data and audio data) based on the distance and direction specified by the user focus position change vector δsn. In this case, the reception-side information processing apparatus 300 is capable of moving and displaying an image based on the image data received from the transmission-side information processing apparatus 200. The display transition example in this case is shown in FIG. 9. The audio data may also be changed based on the movement (e.g., change ratio of speakers).

(Display Transition Example)

FIG. 9 are diagrams showing a transition example of an image displayed on the display section 351 according to the first embodiment of the present disclosure. FIG. 9 show a display transition example in a case where the user focus position change vector δsn satisfies a predetermined condition as described above.

The display example shown in FIG. 9A is the same as that shown in FIG. 1. Here, it is assumed that the user focus position has moved from the stuffed penguin to the stuffed crab as indicated by an arrow of FIG. 9A (arrow from white circle C1 to white circle C4). In this case, the user focus position change vector δsn is calculated, and the user focus position change vector δsn is assumed to satisfy the predetermined condition. The position specified by the user focus position change vector δsn in this case is represented by C4.

FIG. 9B shows a display example of an image whose image area has been changed based on the image data received from the transmission-side information processing apparatus 200. For example, as shown in FIG. 9A, when the user focus position change vector δsn satisfies the predetermined condition, the image area is changed and displayed based on the distance and direction specified by the user focus position change vector δsn. For example, the image area is changed so that the stuffed crab is located at the center position of the display screen of the display section 351.

(Notification Example of Image/Audio Stream Change Request)

Here, in the first embodiment of the present disclosure, an example where the reception-side information processing apparatus 300 includes the user information acquisition section 360 is shown. In this case, the reception-side information processing apparatus 300 needs to transmit, to the transmission-side information processing apparatus 200, a change request of a stream generated based on the user information acquired by the user information acquisition section 360. In this regard, in descriptions below, an example of a transmission method of transmitting a stream change request to the transmission-side information processing apparatus 200 will be described.

In general, a transmission path different from that for transmitting an image/audio is prepared, and a stream change request (e.g., instruction to raise and lower band) is made using a unique protocol on the transmission path. It should be noted that the preparation of another transmission path refers to an establishment of another TCP/IP session, for example.

Further, when using an existing mechanism, the following methods (1) to (3) may be used.

(1) When RTSP (Real Time Streaming Protocol) is used for image/audio transmission control, a transmission apparatus may periodically issue an existence check command with respect to a reception apparatus, and the reception apparatus may transmit a response thereto. This is called Keep-Alive. At this time, a time that the reception apparatus takes to respond to the command after receiving it is made proportional to a band size. For example, when the band is 10 Mbps, a response is transmitted after 10 seconds. In this case, the reception apparatus can measure the time until the response is sent back so as to grasp an intention of a user acquired by the reception apparatus.

(2) When a protocol of Wi-Fi CERTIFIED Miracast is used for an image/audio transmission, a parameter is defined uniquely, and an RTSP SET_PARAMETER command is transmitted periodically from a reception apparatus to a transmission apparatus.

(3) A case where both a transmission apparatus and a reception apparatus exchange a report on an image/audio transmission using RTCP (RTP Control Protocol) will be discussed. In this case, by intentionally changing a content of an RTCP reception report transmitted from the reception apparatus to the transmission apparatus, it can be expected that the transmission apparatus changes a band. Specifically, when lowering the band, the reception apparatus intentionally raises values of "accumulative omission packet count" and "omission rate" within the reception report so as to report to the transmission apparatus as if the whole network is congested. In this case, the transmission apparatus lowers the band for the image/audio transmission so as to cope with the network congestion.

(Operation Example of Information Processing Apparatus (Transmission Side))

Figure 10:
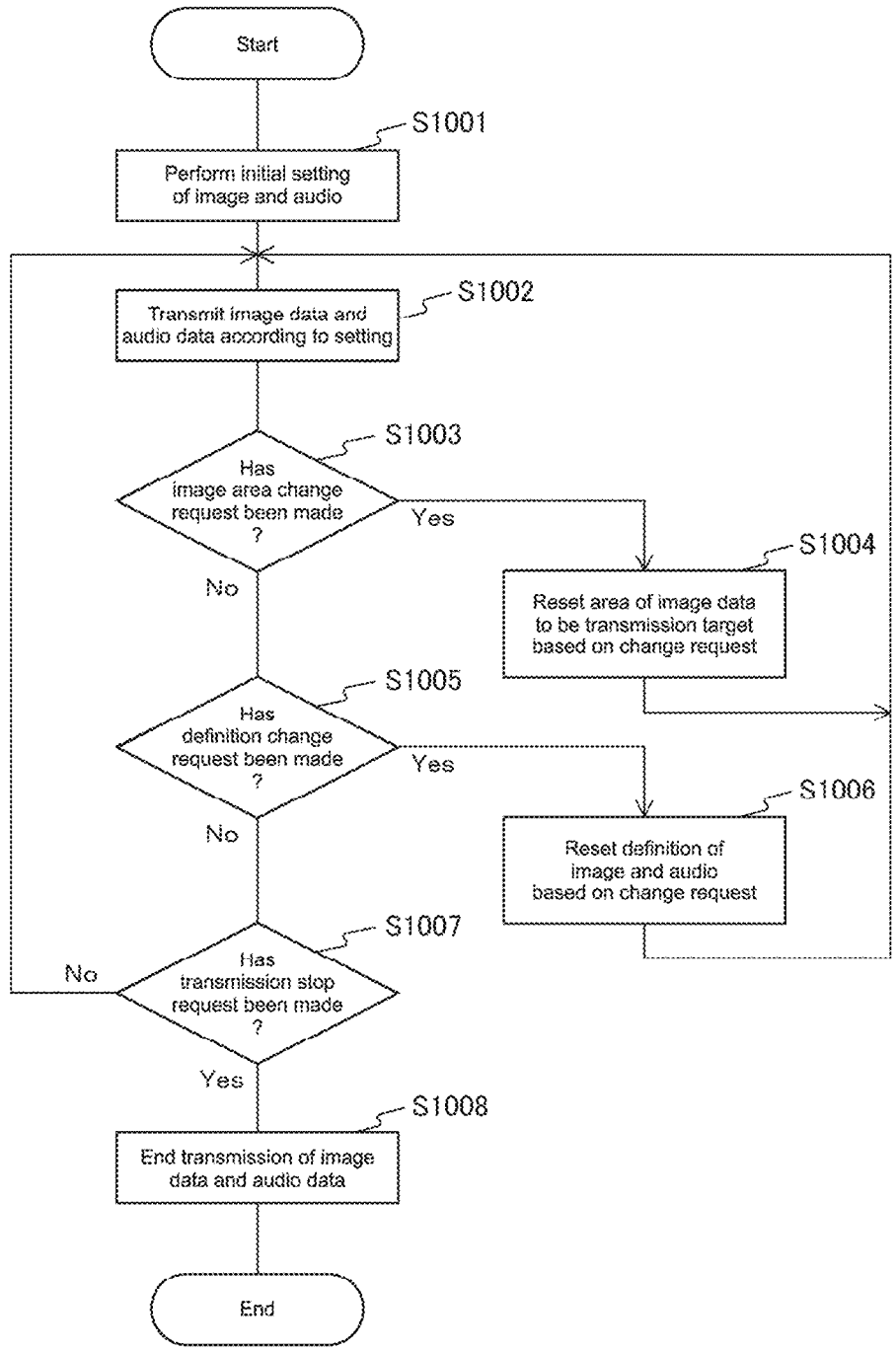
FIG. 10 A flowchart showing an example of a processing procedure of data transmission control processing carried out by the information processing apparatus 200 according to the first embodiment of the present disclosure.

FIG. 10 is a flowchart showing an example of a processing procedure of data transmission control processing carried out by the information processing apparatus 200 according to the first embodiment of the present disclosure. It should be noted that in this example, wireless communication is used between the transmission-side information processing apparatus 200 and the reception-side information processing apparatus 300.

First, the transmission-side information processing apparatus 200 performs an initial setting of an image and audio for transmitting image data and audio data to the reception-side information processing apparatus 300 (Step S1001). The initial setting includes initializing the control signal reception section 230, the image/audio signal generation section 250, the image/audio compression section 260, and the stream transmission section 270, for example.

Here, the control signal reception section 230 and the stream transmission section 270 may be controlled at this time point depending on a type of network to be used so that network connections for exchanging image/audio streams and control signals with the reception-side information processing apparatus 300 are established. For example, in the case of Wi-Fi CERTIFIED Miracast, a network connection with respect to the reception apparatus can be established by a series of operations of WFD (Wi-Fi Display) Connection Setup and the like. The series of operations includes, for example, WFD Device Discovery, WFD Service Discovery (Optional), and WFD Connection Setup. It should be noted that WFD Device Discovery is processing for discovering a counterpart apparatus. WFD Service Discovery is processing for acquiring specific information of the counterpart apparatus. WFD Connection Setup is processing for establishing a network connection with the counterpart apparatus.

Further, depending on the transmission method for image data and audio data, setting information may be exchanged with the reception-side information processing apparatus 300 at this time point. For example, when using a method conforming to Wi-Fi CERTIFIED Miracast, a presetting called Capability Negotiation is carried out at this time point. Here, Capability Negotiation is processing for carrying out an exchange of a message sequence using an RTSP protocol with WFD Source and WFD Sink before WFD Session Establishment after completing WFD Connection Setup.

Subsequently, the transmission-side information processing apparatus 200 starts transmitting an image/audio stream to the reception-side information processing apparatus 300 (Step S1002). Simultaneous with the start of the transmission, the transmission-side information processing apparatus 200 starts an operation of the controller 240 for carrying out a setting change corresponding to a change request from the reception-side information processing apparatus 300.

Then, the controller 240 judges whether an image area change request from the reception-side information processing apparatus 300 has been received by the control signal reception section 230 (Step S1003). When the image area change request is received (Step S1003), the controller 240 controls the image/audio signal generation section 250 based on the image area change request (Step S1004). Specifically, the controller 240 outputs coordinate information of an image included in the image area change request to the image/audio signal generation section 250. Further, the image/audio signal generation section 250 resets an area of the image data to be a transmission target based on the coordinate information of the image (Step S1004). For example, the image/audio signal generation section 250 resets the area of the image data to be the transmission target such that a position specified by the coordinate information of the image is set at the center of the display screen (Step S1004). Then, the image/audio signal generation section 250 generates an image signal and audio signal based on the reset area.

Further, the controller 240 judges whether an image/audio definition change request from the reception-side information processing apparatus 300 has been received by the control signal reception section 230 (Step S1005). When the image/audio definition change request is received (Step S1005), the controller 240 controls the image/audio compression section 260 based on the image/audio definition change request (Step S1006). Specifically, the controller 240 controls the image/audio compression section 260 to set variables regarding compression processing or change a resolution for raising or lowering the definition based on the image/audio definition change request (Step S1006). For example, when the image/audio definition change request is a change request for raising the definition, the controller 240 controls the image/audio compression section 260 to set a variable regarding the compression processing or change the resolution for raising the definition. On the other hand, for example, when the image/audio definition change request is a change request for lowering the definition, the controller 240 controls the image/audio compression section 260 to set a variable regarding the compression processing or change the resolution for lowering the definition.

Furthermore, the controller 240 judges whether a transmission stop request from the reception-side information processing apparatus 300 has been received by the control signal reception section 230 (Step S1007). When the transmission stop request is received (Step S1007), the controller 240 performs control for ending the transmission of image data and audio data (Step S1008). On the other hand, when the transmission stop request is not received (Step S1007), the processing returns to Step S1002.

It should be noted that it is also possible for the transmission-side information processing apparatus 200 to temporarily stop, before transmitting an image/audio stream reset in Steps S1004 and S1006, the transmissions before that and notify the reception-side information processing apparatus 300 that "another type of stream will be transmitted".

For example, depending on a transmission method, a change of an encode parameter may be explicitly notified from the transmission-side information processing apparatus 200 to the reception-side information processing apparatus 300 via another path. In the case of Wi-Fi CERTIFIED Miracast, for example, a notification can be made by a mechanism called Capability Re-negotiation. Here, Capability Re-negotiation is used for WFD Source to notify WFD Sink in advance a change of an image (video) resolution or frame rate. Moreover, WFD Source can update the parameter of WFD Session as appropriate using the RTSP protocol. For example, it is possible to uniquely extend the standard of Wi-Fi CERTIFIED Miracast and update various parameters using the RTSP protocol.

As described above, it becomes possible for the transmission apparatus to receive a request from the reception apparatus that the user is viewing or operating to dynamically change a transmission stream and transmit it.

(Operation Example of Information Processing Apparatus (Reception Side))

Figure 11:
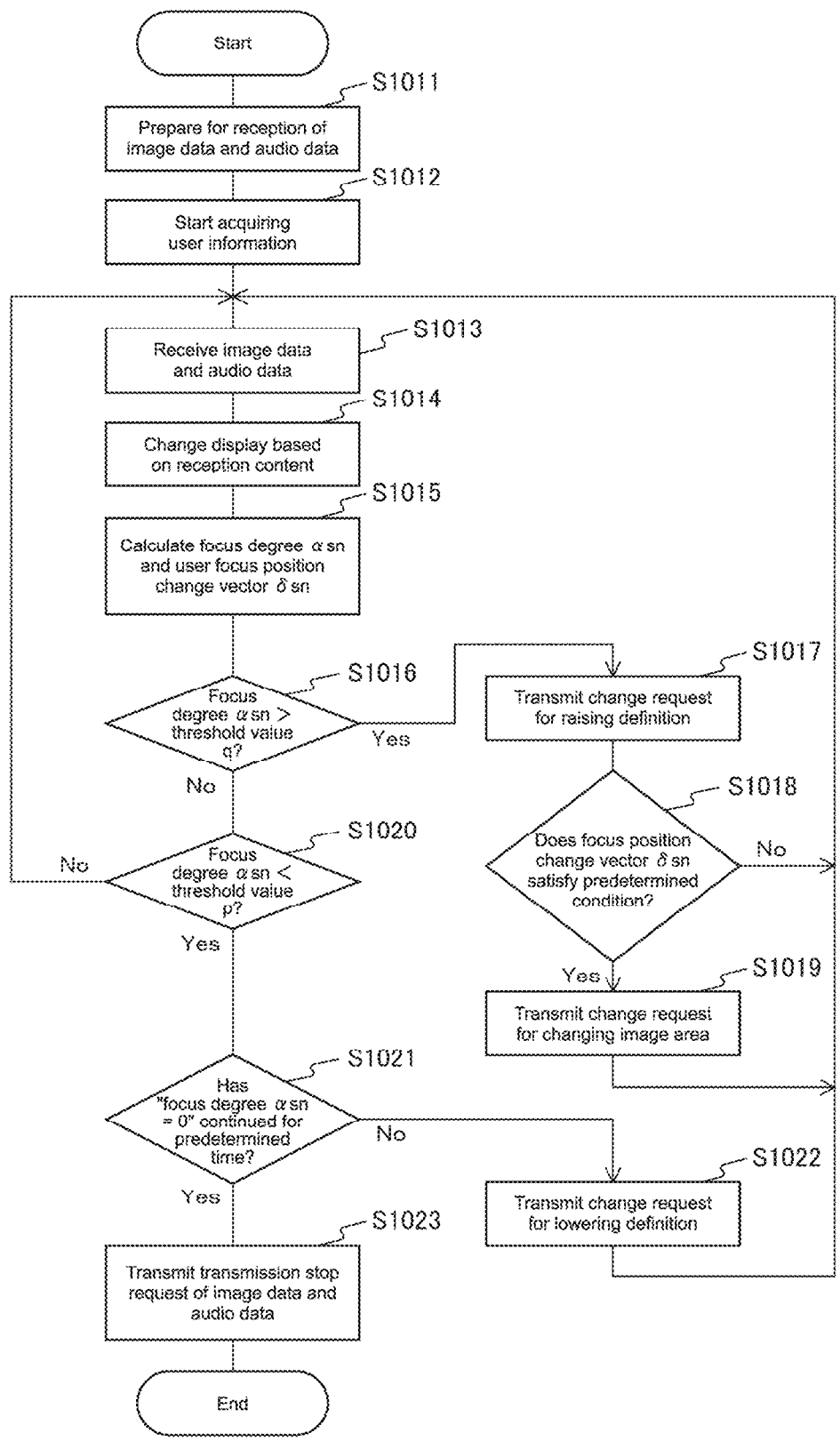
FIG. 11 A flowchart showing an example of a processing procedure of data reception control processing carried out by the information processing apparatus 300 according to the first embodiment of the present disclosure.

FIG. 11 is a flowchart showing an example of a processing procedure of data reception control processing carried out by the information processing apparatus 300 according to the first embodiment of the present disclosure. It should be noted that in this example, wireless communication is used between the transmission-side information processing apparatus 200 and the reception-side information processing apparatus 300.

First, the reception-side information processing apparatus 300 prepares for an image/audio reception (Step S1011). The preparation includes, for example, initialization of the stream reception section 330, the image/audio development section 340, the image/audio output section 350, and the control signal transmission section 380. Here, as described above, depending on the type of network to be used, it is possible to control the stream reception section 330 and the control signal transmission section 380 at this time point and establish a network connection with the transmission-side information processing apparatus 200. Further, as described above, depending on the image/audio transmission method, setting information may be exchanged with the transmission-side information processing apparatus 200 at this time point.

Subsequently, the reception-side information processing apparatus 300 initializes the user information acquisition section 360 and the control signal generation section 370 and starts an operation of detecting a user state and operation and an operation of calculating a signal for control (Step S1012).

Subsequently, the reception-side information processing apparatus 300 starts receiving compressed image data and audio data (Step S1013). In this case, for example, two connections for data and control may be established. Then, the image/audio output section 350 changes the display content and outputs the image data and audio data based on the received content (Step S1014).

Specifically, a stream (image stream and audio stream) transmitted from the transmission-side information processing apparatus 200 is received by the stream reception section 330 via the antenna 310 and the wireless communication section 320 (Step S1013). Then, the received stream is input and developed by the image/audio development section 340, and the developed image data and audio data are output from the image/audio output section 350 (Step S1014).

For example, when the image/audio stream or a data amount thereof as a target is changed during stream transmission in the transmission-side information processing apparatus 200, a display content is changed according to that change. For example, when the user focus degree $\alpha sn$ is larger than the threshold value q, the definition of the image corresponding to the received image stream is raised for display as described above. On the other hand, when the user focus degree $\alpha sn$ is smaller than the threshold value p, the definition of the image corresponding to the received image stream is lowered for display as described above.

It should be noted that when the transmission-side information processing apparatus 200 explicitly notifies a stream update such as an image coordinate change and a data amount change, for example, the image/audio development section 340 and the image/audio output section 350 may be re-initialized based on the notification information.

Further, the control signal generation section 370 calculates the user focus degree $\alpha sn$ and the user focus position change vector δsn (Step S1015). The calculation of the focus degree αsn and the change vector δsn is carried out based on the user information acquired by the user information acquisition section 360. The focus degree αsn and the change vector δsn may also be calculated only when there is a change in the operation or intention of the user who is operating or viewing.

Subsequently, the control signal generation section 370 judges whether the user focus degree αsn is larger than the threshold value q (Step S1016). When the user focus degree αsn is larger than the threshold value q (Step S1016), the control signal generation section 370 generates a control signal regarding a change request for raising the definition of the image/audio stream sn being received (Step S1017). Then, the control signal transmission section 380 transmits the generated control signal to the information processing apparatus 200 via the wireless communication section 320 and the antenna 310 (Step S1017).

Next, the control signal generation section 370 judges whether the user focus position change vector δsn satisfies a predetermined condition (Step S1018). When the user focus position change vector δsn does not satisfy a predetermined condition (Step S1018), the processing returns to Step S1013). On the other hand, when the user focus position change vector δsn satisfies a predetermined condition (Step S1018), the control signal generation section 370 generates a control signal regarding a change request for changing an image area (Step S1019). For example, a control signal regarding a change request for changing the image coordinates (i.e., change of image area) only by an amount corresponding to the user focus position change vector δsn is generated. Then, the control signal transmission section 380 transmits the generated control signal to the information processing apparatus 200 via the wireless communication section 320 and the antenna 310 (Step S1019).

Further, when the user focus degree αsn is equal to or lower than the threshold value q (Step S1016), the control signal generation section 370 judges whether the user focus degree αsn is smaller than the threshold value p (Step S1020). When the user focus degree αsn is equal to or larger than the threshold value p (Step S1020), the processing returns to Step S1013.

On the other hand, when the user focus degree asn is smaller than the threshold value q (Step S1020), the control signal generation section 370 judges whether the user focus degree αsn is 0 for a predetermined time (Step S1021). When the user focus degree αsn is not 0 for a predetermined time (Step S1021), the control signal generation section 370 generates a control signal regarding a change request for lowering the definition of the image/audio stream sn being received (Step S1022). Then, the control signal transmission section 380 transmits the generated control signal to the information processing apparatus 200 via the wireless communication section 320 and the antenna 310 (Step S1022).

Moreover, when the user focus degree αsn is 0 for a predetermined time (Step S1021), the control signal generation section 370 generates a control signal regarding a transmission stop request of the image/audio stream sn being received (Step S1023). Then, the control signal transmission section 380 transmits the generated control signal to the information processing apparatus 200 via the wireless communication section 320 and the antenna 310 (Step S1023). It should be noted that Step S1015 is an example of the acquisition step described in the claims, and Steps S1016 to S1023 are an example of the control step described in the claims.

As described above, according to the embodiment of the present disclosure, transmission band control that suits the operation, state, and intention of the user can be performed in a communication system that compresses image data and audio data and transmits them to another information processing apparatus via a network for them to be output. For example, a transmission amount can be limited appropriately based on the operation, state, and intention of the user. As the transmission band control, for example, a change of an image resolution or a change of an image area can be performed.

Furthermore, for example, by automatically changing the data amount of a stream according to the operation, state, and intention of the user, it is possible to realize a band distribution optimal for the user without operations of "raising/lowering resolution", "expansion/contraction", "increasing/reducing band", and the like.

For example, by grasping the state or intention of the user viewing the image/audio and extracting a focused part or contracting an unfocused part based on the grasped data, the band used for the image/audio transmission can be controlled dynamically and automatically as appropriate.

For example, since a partial area of an image photographed or generated by the transmission apparatus can be transmitted limitedly according to an operation, state, and intention of the user, a desired image area can be viewed appropriately. As described above, by the reception apparatus receiving and displaying a part of the image of the transmission apparatus, the band can be saved as compared to the case of receiving the entire image. Moreover, since the partial image from the transmission apparatus can be changed according to the operation with respect to the reception apparatus, it becomes easy to access a desired area.

For example, a network band can be saved by automatically lowering the image/audio transmission band when the user is not viewing an image/audio. By automatically lowering the image/audio transmission band according to the operation, state, and intention of the user as described above, it becomes possible to lower the load of image/audio data expansion processing and display processing of the reception apparatus when unnecessary for the user and lower the load of data compression processing also for the transmission apparatus. As described above, power consumption can be cut for both the transmission apparatus and the reception apparatus.

For example, other tasks may be carried out on the same screen while Wi-Fi CERTIFIED Miracast is being executed. In such a case, when a band is used for the tasks, control can be performed so as to reduce only that much streaming band.

(Modified Example of Communication System)

Figure 12:
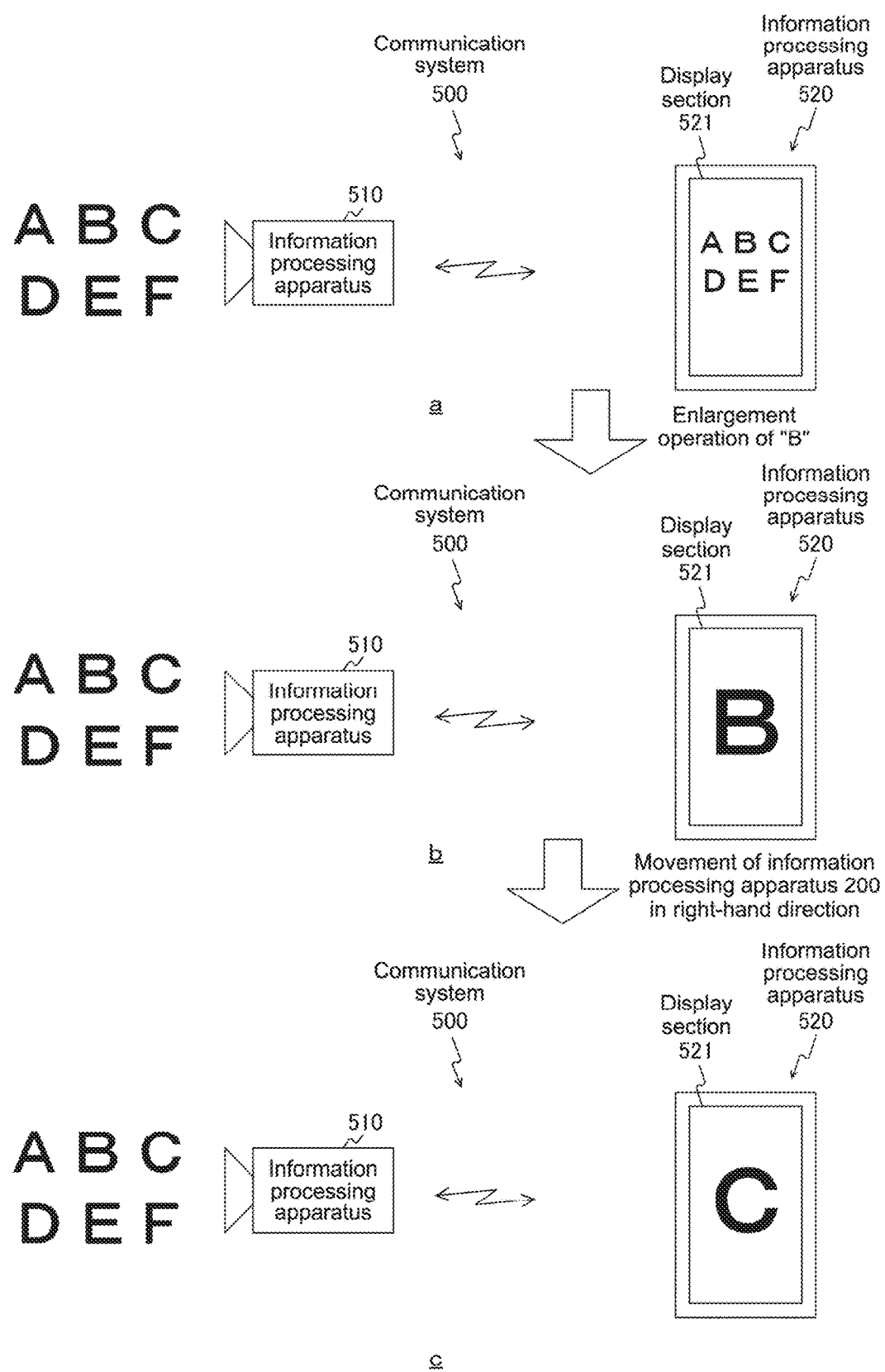
FIG. 12 Diagrams showing a structural example of a communication system 500 according to the first embodiment of the present disclosure.

FIG. 12 are diagrams showing a structural example of a communication system 500 according to the first embodiment of the present disclosure. It should be noted that the communication system 500 is a communication system obtained by partially modifying the communication system 100. Specifically, an example where an image pickup apparatus (e.g., digital still camera and digital video camera (e.g., camera-integrated recorder)) is used as the transmission apparatus and a mobile information processing apparatus (e.g., smartphone) is used as the reception apparatus is shown. FIGS. 12A to 12C show a transition example of an image displayed on a display section 521 of an information processing apparatus 520.

The communication system 500 includes information processing apparatuses 510 and 520. It should be noted that the information processing apparatus 510 corresponds to the information processing apparatus 200 shown in FIG. 1, and the information processing apparatus 520 corresponds to the information processing apparatus 300 shown in FIG. 1.

Here, images taken by the information processing apparatus 510 have substantially the same information amount, and the images have a larger information amount and higher resolution than an image displayed on the display section 521 of the information processing apparatus 520. Moreover, the information processing apparatus 520 includes a touch panel that receives an operation input from a user and a sensor for detecting a movement and positional change of the information processing apparatus 520 (e.g., acceleration sensor). The touch panel and the sensor correspond to the user information acquisition section 360 shown in FIG. 3.

As shown in FIG. 12A, an image based on a stream transmitted from the information processing apparatus 510 can be displayed on the display section 521 of the information processing apparatus 520. In this case, the information processing apparatus 510 generates an image stream obtained by contracting the whole image so that the image fits in a display screen of the display section 521 of the information processing apparatus 520, and transmits the image stream to the information processing apparatus 520 (Step S1002 shown in FIG. 10).

Here, a case where the user operates a touch panel for enlarging a specific area of the image displayed on the display section 521 of the information processing apparatus 520 will be discussed. For example, a case where the user operates a touch panel for enlarging "B" out of "ABCDEF" shown in FIG. 12A will be discussed. Further, by the operation, the user focus degree $\alpha sn$ becomes larger than the threshold value q (Step S1016 shown in FIG. 10), and the user focus position change vector $\delta sn$ satisfies the predetermined condition (Step S1018 shown in FIG. 10).

In this case, the information processing apparatus 520 transmits to the information processing apparatus 510 a control signal regarding a definition change request for raising the definition (e.g., resolution) of the image/audio stream sn being received (Step 1017 shown in FIG. 10). Moreover, the information processing apparatus 520 transmits to the information processing apparatus 510 a control signal regarding an image area change request for changing a center of the image of the image/audio stream sn being received only by an amount corresponding to the user focus position change vector $\delta sn$ (Step S1019 shown in FIG. 10).

When the change requests are received, the information processing apparatus 510 performs a setting to change the center position of the image based on the control signal regarding the image area change request (Step S1004 shown in FIG. 10). The information processing apparatus 510 sets the resolution to be high based on the control signal regarding the definition change request (Step S1006 shown in FIG. 10). Then, the information processing apparatus 510 transmits a new stream including those settings to the information processing apparatus 520 (Step S1002 shown in FIG. 10). A display example of the image based on the new stream is shown in FIG. 12B.

As shown in FIG. 12B, displayed on the display section 521 of the information processing apparatus 520 is an image obtained by partially enlarging an image transmitted from the information processing apparatus 510 (image with raised resolution) while using an area specified by the user (B) as a center.

Next, a case where the user operating the information processing apparatus 520 moves the information processing apparatus 520 laterally in a right-hand direction will be discussed. By the movement operation, it is assumed that the user focus degree $\alpha sn$ becomes larger than the threshold value q (Step S1016 shown in FIG. 10) and the user focus position change vector $\delta sn$ satisfies a predetermined condition (Step S1018 shown in FIG. 10). It should be noted that the movement direction and amount of the information processing apparatus 520 are detected by the acceleration sensor, for example.

In this case, the information processing apparatus 520 transmits to the information processing apparatus 510 a control signal regarding a definition change request for raising the definition (e.g., resolution) of the image/audio stream sn being received (Step 1017 shown in FIG. 10). Moreover, the information processing apparatus 520 transmits to the information processing apparatus 510 a control signal regarding an image area change request for changing a center of the image of the image/audio stream sn being received only by an amount corresponding to the user focus position change vector $\delta sn$ (Step S1019 shown in FIG. 10).

Specifically, the user focus position change vector $\delta sn$ is calculated according to the fact that the user focus has moved laterally in the right-hand direction. Then, a control signal regarding a change request for moving the image laterally in the right-hand direction is transmitted to the information processing apparatus 510.

When the change requests are received, the information processing apparatus 510 performs a setting to change the center position of the image based on the control signal regarding the image area change request (Step S1004 shown in FIG. 10). The information processing apparatus 510 sets the resolution to be high based on the control signal regarding the definition change request (Step S1006 shown in FIG. 10). It should be noted that since the resolution is already set high in the example shown in FIG. 12B, the resolution is maintained. Then, the information processing apparatus 510 transmits a new stream including those settings to the information processing apparatus 520 (Step S1002 shown in FIG. 10). A display example of the image based on the new stream is shown in FIG. 12C.

As shown in FIG. 12C, displayed on the display section 521 of the information processing apparatus 520 is an image obtained by partially enlarging an image transmitted from the information processing apparatus 510 (image with maintained resolution) while using an area specified by the user operation (B) as a center.

As described above, it is possible to easily perform enlargement display of a specific area (e.g., "B" and "C") of the image transmitted from the transmission apparatus while automatically reducing the stream data amount based on the user operation. As a result, user operations become easier.

<2. Second Embodiment>

The first embodiment of the present disclosure has described the example where wireless communication is used between two information processing apparatuses. Here, a case where wireless communication is used among 3 or more information processing apparatuses is also assumed, for example.

In this regard, according to a second embodiment of the present disclosure, an example of using wireless communication among 3 or more information processing apparatuses will be described.

(Structural Example of Communication System)

Figure 13:
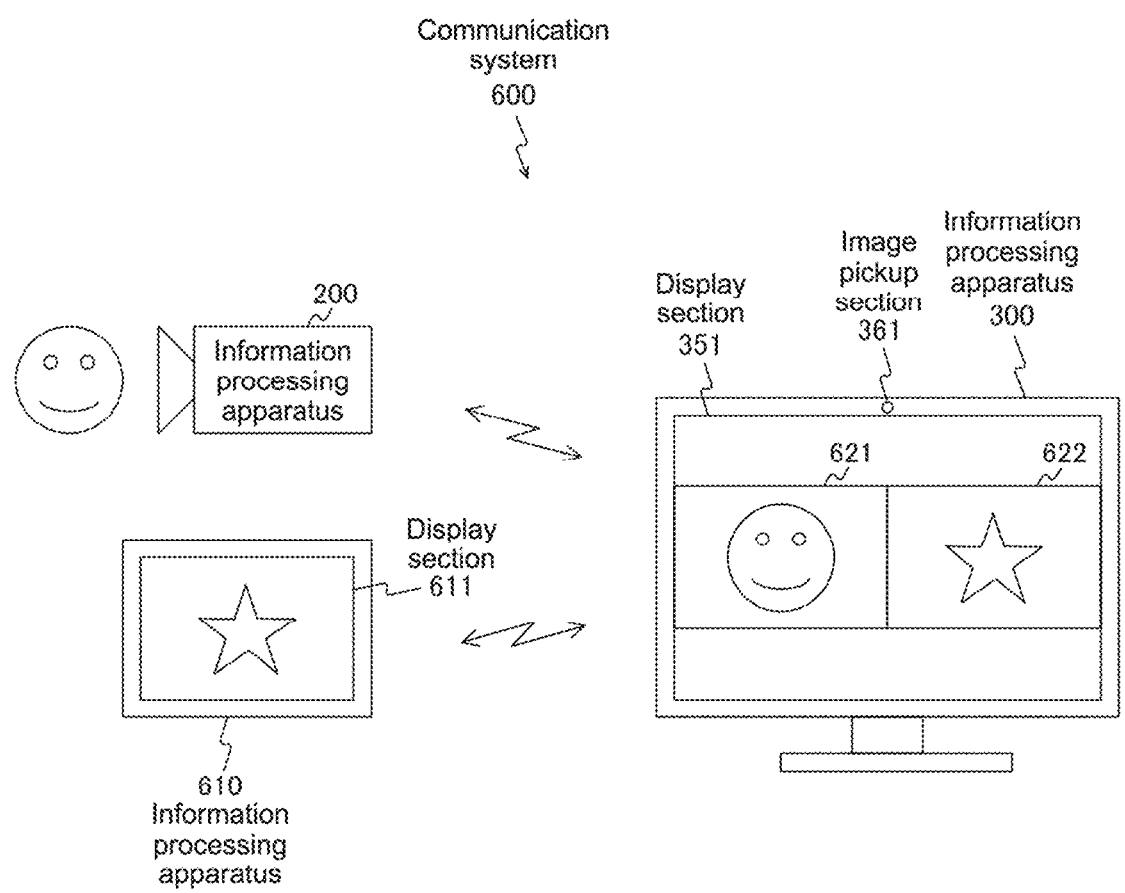
FIG. 13 A block diagram showing a structural example of a communication system 600 according to a second embodiment of the present disclosure.

FIG. 13 is a block diagram showing a structural example of a communication system 600 according to the second embodiment of the present disclosure.

The communication system 600 is a communication system obtained by adding an information processing apparatus 610 to the communication system 100 shown in FIG. 1. It should be noted that since points other than adding the information processing apparatus 610 are the same as those of the communication system 100 shown in FIG. 1, points different from the communication system 100 will mainly be described herein.

The information processing apparatus 610 is, for example, a display apparatus including a wireless communication function (e.g., personal computer) or a mobile information processing apparatus (e.g., smartphone and tablet terminal). Moreover, the information processing apparatus 200 and the information processing apparatus 610 are each a transmission apparatus including a wireless communication function, and the information processing apparatus 300 is a reception apparatus including a wireless communication function.

Image data and audio data generated by an image pickup operation are transmission targets of the information processing apparatus 200. Moreover, an image displayed on a display section 611 and audio output from an audio output section (not shown) are transmission targets of the information processing apparatus 610.

[Display Transition Example of Image Transmitted from Plurality of Information Processing Apparatuses]

Figure 14:
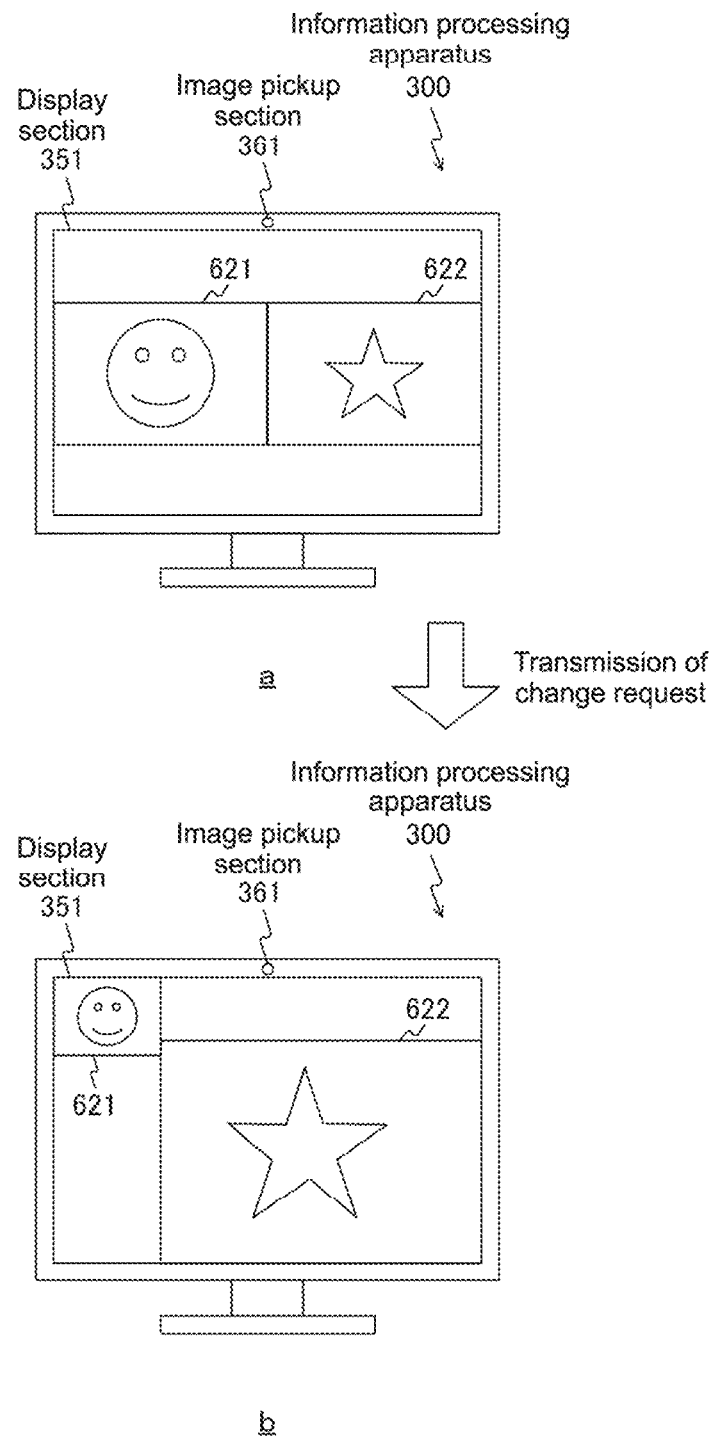
FIG. 14 Diagrams showing a transition example of an image displayed on the display section 351 of the information processing apparatus 300 according to the second embodiment of the present disclosure.

FIG. 14 are diagrams showing a transition example of an image displayed on the display section 351 of the information processing apparatus 300 according to the second embodiment of the present disclosure. With reference to FIGS. 10 and 11, FIG. 14 will be described together with operations of the communication system 600.

First, the information processing apparatus 200 and the information processing apparatus 610 each transmit a stream having a standard definition (image data and audio data) to the information processing apparatus 300 (Steps S1001 and S1002).

Further, the information processing apparatus 300 displays, on the display section 351, images corresponding to the two streams respectively transmitted from the information processing apparatus 200 and the information processing apparatus 610 in the same size as shown in FIG. 14A (Steps S1011 to S1014). It should be noted that in FIGS. 13 and 14, an image corresponding to the stream transmitted from the information processing apparatus 200 is referred to as image 621, and an image corresponding to the stream transmitted from the information processing apparatus 610 is referred to as image 622.

Regarding the images 621 and 622, the information processing apparatus 300 starts monitoring which of the images the viewer is focusing on or a remote controller is pointing at (Steps S1012 and S1015).

Here, it is assumed that the image 622 is being focused by the viewer or a part of the image 622 on the display section 351 is being pointed at by a remote controller. In this case, the focus degree αsn regarding the image 622 becomes large, and the focus degree αsn regarding the image 621 becomes small. In addition, if more time elapses, a difference between the focus degree αsn regarding the image 621 and the focus degree αsn regarding the image 622 becomes large, and thus it is assumed that "focus degree αsn regarding image 621<threshold value p" or "focus degree αsn regarding image 622>threshold value q" is established.

For example, when "focus degree αsn regarding image 621<threshold value p" is established (Step S1020), the information processing apparatus 300 transmits a change request for lowering the definition (e.g., request to lower resolution or bit rate of audio) to the information processing apparatus 200 (Step S1022). When "focus degree αsn regarding image 622>threshold value q" is established (Step S1016), the information processing apparatus 300 transmits a change request for raising the definition (e.g., request to raise resolution or bit rate of audio) to the information processing apparatus 610 (Step S1017).

It should be noted that FIG. 14 show an example of displaying entire images obtained by contracting the images corresponding to the two streams respectively transmitted from the information processing apparatus 200 and the information processing apparatus 610 (images 621 and 622). In this case, the image area is fixed, and processing related to the change of an image area may be omitted (Steps S1018 and S1019).

Further, upon receiving the change request for raising the definition (Step S1005), the information processing apparatus 610 resets the definition of the image and audio based on the change request (Step S1006). In other words, a setting for generating an image and audio having a high definition is carried out based on the change request (Step S1006). Subsequently, the information processing apparatus 610 transmits a stream of the image data and audio data generated after the reset to the information processing apparatus 300 (Step S1002).

Upon receiving the change request for lowering the definition (Step S1005), the information processing apparatus 200 resets the definition of the image and audio based on the change request (Step S1006). In other words, a setting for generating an image and audio having a low definition is carried out based on the change request (Step S1006). Subsequently, the information processing apparatus 200 transmits a stream of the image data and audio data generated after the reset to the information processing apparatus 300 (Step S1002).

Further, the information processing apparatus 300 receives the two streams respectively transmitted from the information processing apparatus 200 and the information processing apparatus 610 after the reset (Step S1013). Then, the information processing apparatus 300 displays images corresponding to the received two streams on the display section 351 (Step S1014). In this case, the information processing apparatus 300 changes a display content of the images based on the content of the received image data and displays them (Step S1014). For example, as shown in FIG. 14B, the image 621 corresponding to the stream transmitted from the information processing apparatus 200, on which a setting corresponding to the change request for lowering the definition has been made, is displayed while being contracted (Step S1014). On the other hand, the image 622 corresponding to the stream transmitted from the information processing apparatus 610, on which a setting corresponding to the change request for raising the definition has been made, is displayed while being enlarged (Step S1014).

Here, a case where the focus degree αsn regarding the image 621 is 0 and such a state continues for a predetermined time (Step S1021) will be discussed. In this case, the information processing apparatus 300 transmits a transmission stop request of the stream (transmission stop request of image data and audio data) to the information processing apparatus 200 (Step S1023). Upon receiving the stream transmission stop request (Step S1007), the information processing apparatus 200 ends the stream transmission (Step S1008). In this case, since the stream is no longer transmitted from the information processing apparatus 200, only the image 622 corresponding to the stream transmitted from the information processing apparatus 610 is displayed on the display section 351 (Step S1014). For example, the image 622 is displayed on the entire screen of the display section 351 (Step S1014).

As described above, the control signal generation section 370 of the information processing apparatus 300 can perform stream band control of the two streams respectively transmitted from the information processing apparatus 200 and the information processing apparatus 610 based on the user information acquired by the user information acquisition section 360.

It should be noted that control may be performed to minimize the total band of the two streams respectively transmitted from the information processing apparatus 200 and the information processing apparatus 610. For example, a maximum acceptable value of the total band is set in the control signal generation section 370 of the reception-side information processing apparatus 300. Then, the control signal generation section 370 acquires, after transmitting a change request to lower a bit rate to the information processing apparatus 200, bit rates of the two streams respectively transmitted from the information processing apparatus 200 and the information processing apparatus 610 from the stream reception section 330. Subsequently, the control signal generation section 370 calculates the total band of the acquired two streams. Then, the control signal generation section 370 determines a bit rate of the stream transmitted from the information processing apparatus 610 within a range that does not exceed the set maximum acceptable value, and transmits a change request for raising the bit rate to that bit rate to the information processing apparatus 610.

As described above, according to the second embodiment of the present disclosure, even when a plurality of images/audio transmitted from a plurality of transmission apparatuses are received by a single reception apparatus, transmission band control that suits an operation, state, and intention of the user can be performed as appropriate. For example, it is possible to reduce the band of a part of the plurality of image/audio streams according to the operation, state, and intention of the user and increase the band of the rest of the streams.

Moreover, for example, when a plurality of image/audio streams are received and displayed by the reception apparatus, an image/audio important for the user at that time can be enjoyed automatically at a high quality, and a band of the image/audio other than that can be adjusted automatically.

<3. Third Embodiment>

The first and second embodiments of the present disclosure have described the example where user information is acquired by the reception-side information processing apparatus and band control is performed based on that user information. Here, user information may be acquired by the transmission-side information processing apparatus, and band control may be performed based on that user information.

In this regard, a third embodiment of the present disclosure describes an example where user information is acquired by the transmission-side information processing apparatus and band control is performed based on that user information.

(Structural Example of Communication System)

Figure 15:
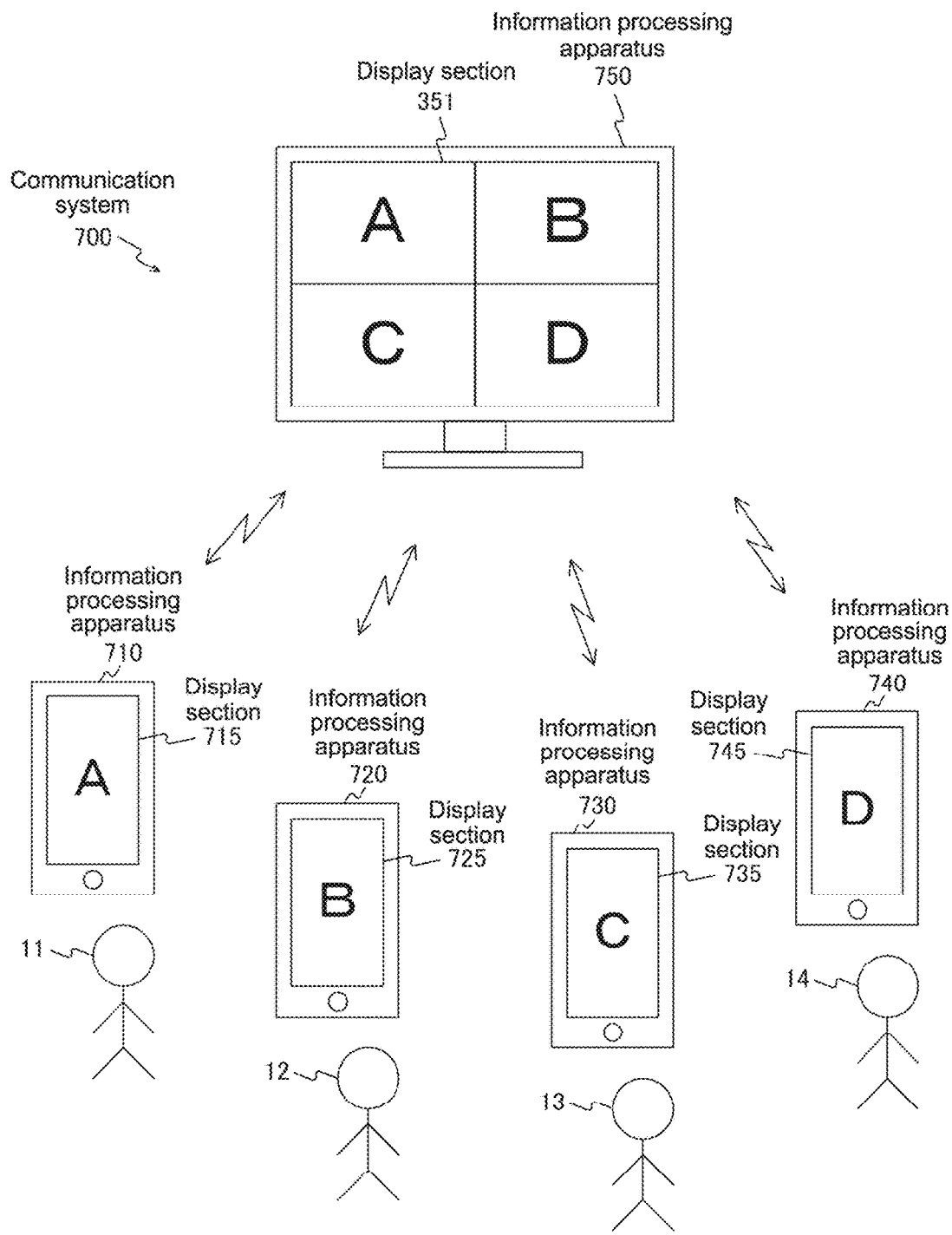
FIG. 15 A block diagram showing a structural example of a communication system 700 according to a third embodiment of the present disclosure.

FIG. 15 is a block diagram showing a structural example of a communication system 700 according to the third embodiment of the present disclosure.

The communication system 700 includes information processing apparatuses 710, 720, 730, 740, and 750. It should be noted that the information processing apparatuses 710, 720, 730, and 740 are each a transmission apparatus including a wireless communication function and correspond to the information processing apparatus 200 shown in FIG. 1. The information processing apparatus 750 is a reception apparatus including a wireless communication function and corresponds to the information processing apparatus 300 shown in FIG. 1.

The information processing apparatus 750 is, for example, a display apparatus including a wireless communication function (e.g., television, projector, and personal computer) or a mobile information processing apparatus (e.g., smartphone and tablet terminal). The information processing apparatuses 710, 720, 730, and 740 are each a display apparatus including a wireless communication function (e.g., personal computer) or a mobile information processing apparatus (e.g., smartphone and tablet terminal).

Further, images displayed on display sections 715, 725, 735, and 745 and audio output from audio output sections (not shown) are transmission targets of the information processing apparatuses 710, 720, 730, and 740.

(Structural Example of Information Processing Apparatus (Transmission Side))

Figure 16:
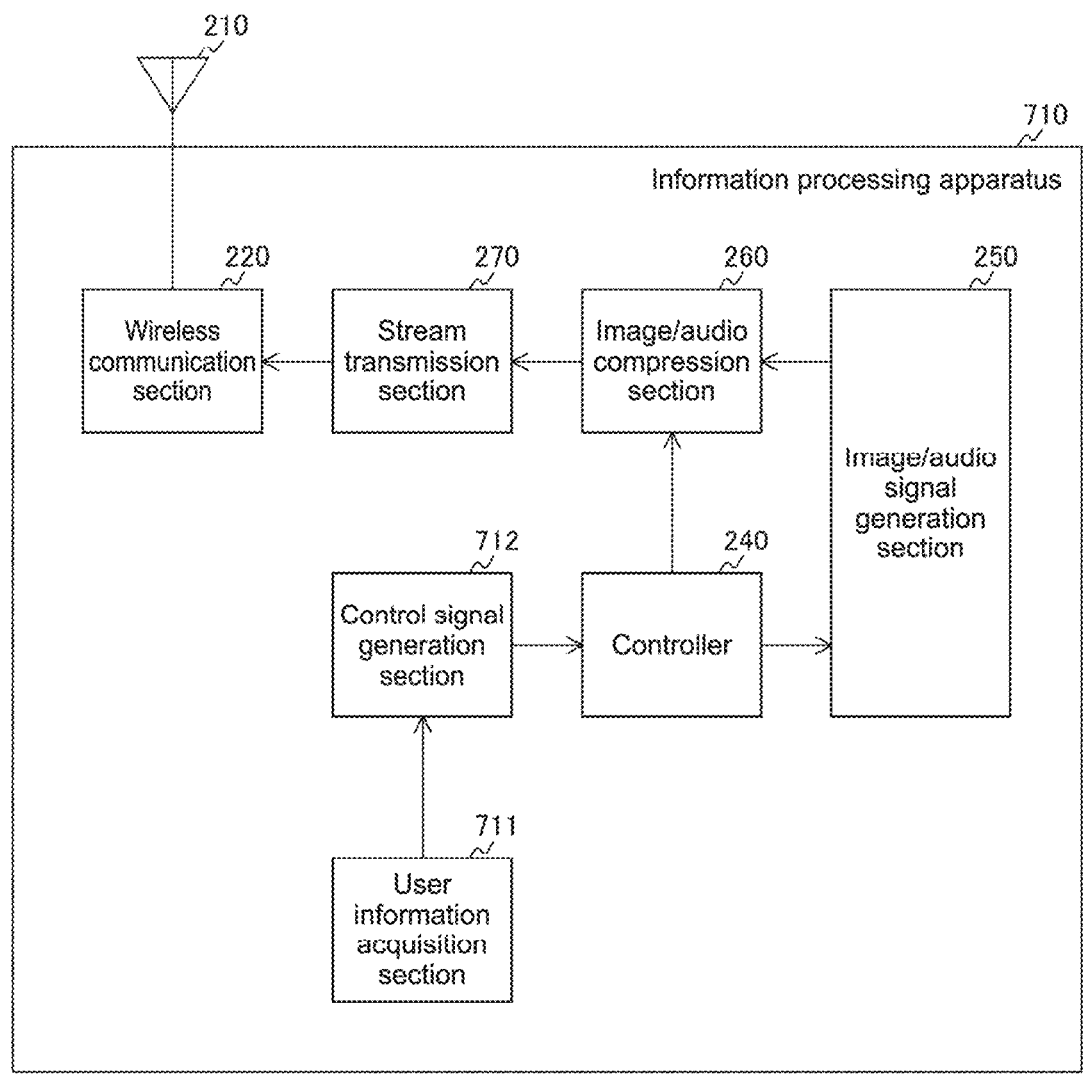
FIG. 16 A block diagram showing a functional structural example of an information processing apparatus 710 according to the third embodiment of the present disclosure.

FIG. 16 is a block diagram showing a functional structural example of the information processing apparatus 710 according to the third embodiment of the present disclosure. It should be noted that since the internal structures of the information processing apparatuses 720, 730, and 740 are the same as that of the information processing apparatus 710, descriptions will only be given on the information processing apparatus 710 herein, and descriptions of the information processing apparatuses 720, 730, and 740 will be omitted. Moreover, the information processing apparatus 710 is obtained by partially modifying the information processing apparatus 200 shown in FIG. 2. Therefore, parts common to the information processing apparatus 200 are denoted by the same reference numerals, descriptions thereof will partially be omitted, and points different from the information processing apparatus 200 will mainly be described.

The information processing apparatus 710 includes a user information acquisition section 711 and a control signal generation section 712.

The user information acquisition section 711 acquires information on a user (user information) and outputs the acquired user information to the control signal generation section 712. It should be noted that the user information acquisition section 711 corresponds to the user information acquisition section 360 shown in FIG. 3.

The control signal generation section 712 performs band control of a stream to be transmitted to another information processing apparatus (e.g., information processing apparatus 750) based on the user information output from the user information acquisition section 711. Specifically, the control signal generation section 712 generates a control signal for performing stream band control based on the user information output from the user information acquisition section 711 and outputs the generated control signal to the controller 240. Then, the controller 240 controls the image/audio signal generation section 250 and the image/audio compression section 260 based on the generated control signal.

(Structural Example of Information Processing Apparatus (Reception Side))

Figure 17:
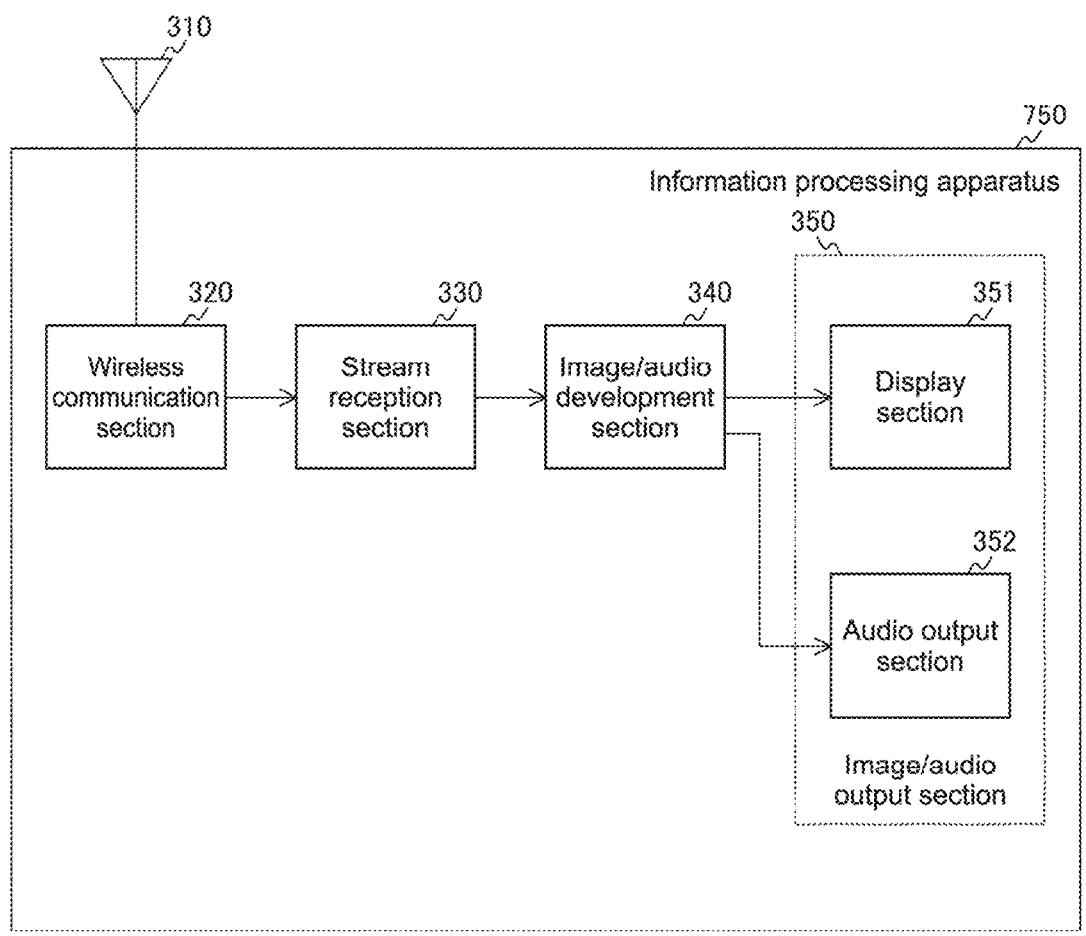
FIG. 17 A block diagram showing a functional structural example of an information processing apparatus 750 according to the third embodiment of the present disclosure.

FIG. 17 is a block diagram showing a functional structural example of the information processing apparatus 750 according to the third embodiment of the present disclosure. It should be noted that the information processing apparatus 750 is obtained by partially modifying the information processing apparatus 300 shown in FIG. 3. Therefore, parts common to the information processing apparatus 300 are denoted by the same reference numerals, descriptions thereof will partially be omitted, and points different from the information processing apparatus 300 will mainly be described.

Specifically, the information processing apparatus 750 is obtained by omitting the user information acquisition section 360, the control signal generation section 370, and the control signal transmission section 380 from the information processing apparatus 300 shown in FIG. 3.

Here, operations of the communication system 700 will be described with reference to FIG. 15.

FIG. 15 assumes a case where users 11 to 14 possessing the information processing apparatuses 710, 720, 730, and 740 perform touch operations on the display sections 715, 725, 735, and 745. In this case, display screen contents displayed on the display sections are transmitted from the information processing apparatuses to the information processing apparatus 750, and the display screens are allocated to the display screen of the display section 351 of the information processing apparatus 750 to be displayed. For example, a display screen content (A) displayed on the display section 715 is transmitted from the information processing apparatus 710 to the information processing apparatus 750, and the display screen content (A) is allocated to the display screen (upper left) of the display section 351 of the information processing apparatus 750 to be displayed.

As described above, by displaying the display screen content displayed on the display section of his/her own information processing apparatus, each of the users 11 to 14 can show the other users the display screen content.

Here, when the display screen contents displayed on the display sections of the information processing apparatuses are displayed on the display section 351 of the information processing apparatus 750, the focus degrees calculated based on the operation states of the users 11 to 14 are set as $\alpha A$ to $\alpha D$, respectively. Specifically, the focus degree calculated based on the operation state of the user 11 is set as $\alpha A$, and the focus degree calculated based on the operation state of the user 12 is set as $\alpha B$. Moreover, the focus degree calculated based on the operation state of the user 13 is set as $\alpha C$, and the focus degree calculated based on the operation state of the user 14 is set as $\alpha D$.

A case where the user 11 wants other users 12 to 14 to focus on his/her own display screen in such a case will be discussed, for example. In this case, the user 11 notifies the intention to the users 12 to 14 and asks the other users 12 to 14 to stop operating the information processing apparatuses 720, 730, and 740. Then, the user 11 causes the other users 12 to 14 to view the display screen of the display section 351 of the information processing apparatus 750 while the user 11 continues operating the information processing apparatus 710.

As described above, when the users 11 to 14 act, the focus degree $\alpha A$ related to the user 11, that is calculated by the control signal generation section 712, becomes large, and the focus degrees $\alpha B$ to $\alpha D$ related to the other users 12 to 14 become small. When the focus degree $\alpha A$ becomes large as described above, the information processing apparatus 710 transmits an image stream having a high definition to the information processing apparatus 750. On the other hand, when the focus degrees $\alpha B$ to $\alpha D$ become small, the information processing apparatuses 720, 730, and 740 transmit image streams having a low definition to the information processing apparatus 750.

Upon receiving the image streams, the information processing apparatus 750 displays images corresponding to the image streams while changing them based on the definition. For example, since an image (A) corresponding to the image stream transmitted from the information processing apparatus 710 has a high definition, the image can be enlarged to be displayed, or an image quality can be enhanced as compared to other images (B to D). Due to such display, the users 11 to 14 can naturally focus on the image (A) transmitted from the information processing apparatus 710 with ease.

On the other hand, since the images (B to D) corresponding to the image streams transmitted from the information processing apparatuses 720, 730, and 740 have a low definition, the images can be contracted to be displayed, or image qualities thereof can be lowered as compared to the image (A) and displayed. The display example in this case is shown in FIG. 18.

(Display Transition Example of Images Transmitted from Plurality of Information Processing Apparatuses)

Figure 18:
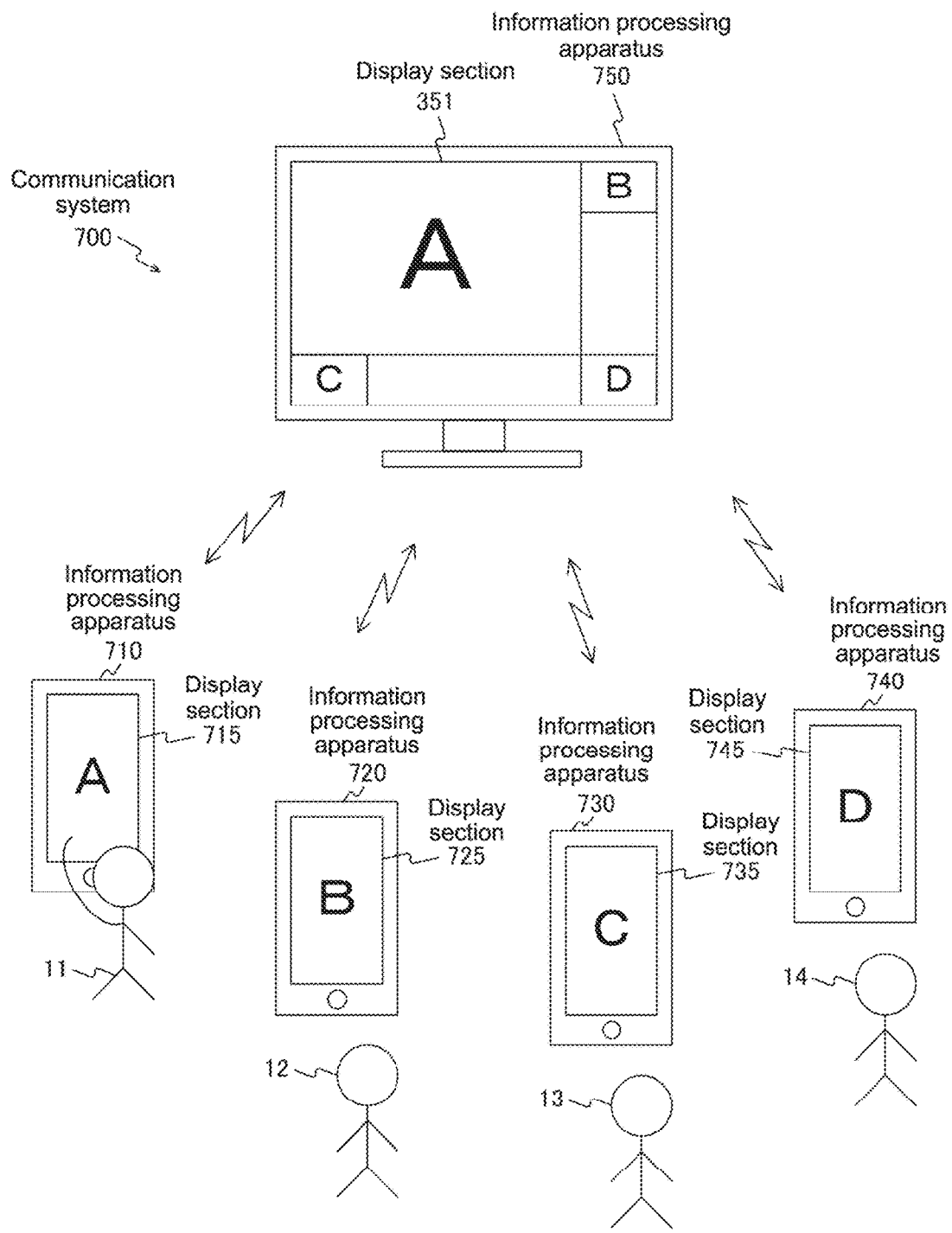
FIG. 18 A diagram showing a transition example of an image displayed on the display section 351 of the information processing apparatus 750 according to the third embodiment of the present disclosure.

FIG. 18 is a diagram showing a transition example of an image displayed on the display section 351 of the information processing apparatus 750 according to the third embodiment of the present disclosure. Specifically, a transition example from the image displayed on the display section 351 shown in FIG. 15 is shown.

As shown in FIG. 18, the image (A) corresponding to the image stream transmitted from the information processing apparatus 710 is enlarged for displayed, and other images (B to D) are contracted for display.

It should be noted that in this example, the focus degrees for determining a definition are calculated based on user operations. It should be noted that the focus degrees may also be determined based on an application executed in each of the information processing apparatuses 710, 720, 730, and 740.

For example, a case where the users 11 to 14 are playing the same game will be discussed. In this game, streams corresponding to game operations are transmitted from the information processing apparatuses 710, 720, 730, and 740 to the information processing apparatus 750 to be displayed on the display section 351 of the information processing apparatus 750. In this case, each information processing apparatus (user information acquisition section 711 and control signal generation section 712) judges whether a game point of own apparatus is higher than those of other apparatuses (other players). Then, when the game point of own apparatus is higher than other apparatuses (other players), it can be judged that the focus degree is high. The information processing apparatus judged to have a high focus degree as described above transmits a stream obtained by raising the definition.

As described above, according to the third embodiment of the present disclosure, user information can be acquired by the transmission-side information processing apparatuses, and appropriate transmission band control can be performed based on the user information. In this case, even when a plurality of images/audio transmitted from the plurality of transmission apparatuses are received by a single reception apparatus, appropriate transmission band control corresponding to the operation, state, and intention of the user can be performed.

<4. Fourth Embodiment>

The first to third embodiments of the present disclosure have described the example of acquiring user information and performing band control based on the user information. Here, in the reception-side information processing apparatus, it is also possible to make an operation related to an image transmitted from the transmission-side information processing apparatus. For example, an operation screen for operating an image transmitted from the transmission-side information processing apparatus (transmission apparatus operation screen) may be displayed on the reception-side information processing apparatus, and various operations may be made on the transmission apparatus operation screen. Moreover, an operation screen for operating the reception-side information processing apparatus (reception apparatus operation screen) may be displayed on the reception-side information processing apparatus, and various operations may be made on the reception apparatus operation screen. However, when a plurality of operation screens can be displayed as described above, there is a fear that the user cannot judge which of the transmission apparatus operation screen and the reception apparatus operation screen is being displayed.

In this regard, in a fourth embodiment of the present disclosure, an example of easily performing operations related to the transmission apparatus and the reception apparatus will be described.

(Structural Example of Communication System)

Figure 19:
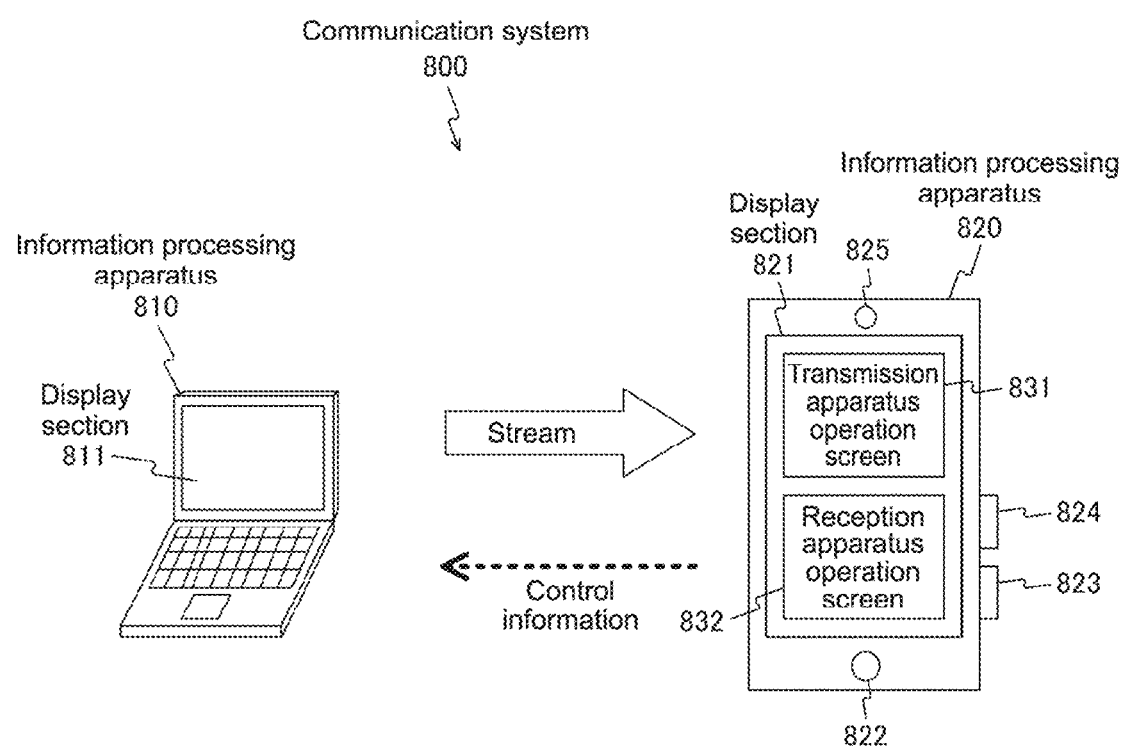
FIG. 19 A diagram showing a structural example of a communication system 800 according to a fourth embodiment of the present disclosure.

FIG. 19 is a diagram showing a structural example of a communication system 800 according to the fourth embodiment of the present disclosure. FIG. 19 shows an example of a system structure in a case of establishing a direct wireless connection between two information processing apparatuses (information processing apparatuses 810 and 820) as in the first to third embodiments of the present disclosure.

The communication system 800 includes information processing apparatuses 810 and 820. The information processing apparatus 810 is a transmission apparatus including a wireless communication function and corresponds to the information processing apparatus 200 shown in FIG. 1. The information processing apparatus 820 is a reception apparatus including a wireless communication function and corresponds to the information processing apparatus 300 shown in FIG. 1.

The information processing apparatus 810 includes a display section 811. The information processing apparatus 820 includes a display section 821, operation members 822 to 824, and an image pickup section 825.

The operation members 822 to 824 are operation members for performing various operations.

The image pickup section 825 is an image pickup section that photographs an object and generates image data (e.g., camera). It should be noted that the operation members 822 to 824 and the image pickup section 825 correspond to the user information acquisition section 360 shown in FIG. 3.

For example, a case where a stream is transmitted from the information processing apparatus 810 to the information processing apparatus 820, and an image corresponding to the stream is displayed on the display section 821 of the information processing apparatus 820 will be discussed. In this case, operations with respect to the transmission-side information processing apparatus 810 can also be made in the reception-side information processing apparatus 820. For example, as shown in FIG. 19, both the transmission apparatus operation screen 831 for performing an operation input with respect to the information processing apparatus 810 and the reception apparatus operation screen 832 for performing an operation input with respect to the information processing apparatus 820 can be displayed on the display section 821 of the information processing apparatus 820. As described above, the transmission apparatus operation screen 831 and the reception apparatus operation screen 832 can be aligned for display, or either one of the operation screens may be made translucent so that both the operation screens can be displayed in an overlapping manner. Moreover, only one of the operation screens may be displayed on the entire screen or a part of the screen. It should be noted that the transmission apparatus operation screen 831 is displayed based on the stream transmitted from the transmission-side information processing apparatus 810. On the other hand, the reception apparatus operation screen 832 is displayed under control of the information processing apparatus 820.

When the operation screens are displayed as described above (both operation screens are aligned for display, operation screens overlap each other for display, or only one of operation screens is displayed), there is a fear that the user cannot easily grasp which of the apparatuses the operation screen belongs to. Particularly when only one of the operation screens is displayed, there is a fear that the user cannot easily grasp which of the apparatuses the operation screen belongs to.

Here, for example, a case where, using a personal computer (PC) as the reception-side information processing apparatus, a remote desktop application is executed using the PC will be discussed. In the remote desktop application, when a mouse cursor is located in a specific area of the display screen, a switch for switching an image displayed on the display screen and an operation appears so that which of the counterpart (transmission apparatus) side and own (reception apparatus) side is to be operated can be selected. Further, a case of executing OS (Operating System) virtualization software (e.g., VMware and VirtualBox) will be discussed. In this case, an input is switched to the counterpart (guest OS) side after an area drawn by the software is clicked by a mouse, and an input is switched to the own (host OS) side after a special key operation is made.

However, a mobile information processing apparatus such as a smartphone and a tablet terminal does not include a mouse and a keyboard in many cases, and only a touch panel and several operation members are provided as an operation reception section in many cases. When using, as the reception apparatus, an apparatus including only a touch panel and several operation members as the operation reception section as described above, it is assumed that the switch of the inputs described above becomes difficult. In this regard, in descriptions below, an example where an input switch can be made with ease even when an apparatus including only a touch panel and several operation members as the operation reception section is used as the reception apparatus will be described.

(Switch Example of Transmission Apparatus Operation Screen and Reception Apparatus Operation Screen)

Figure 20:
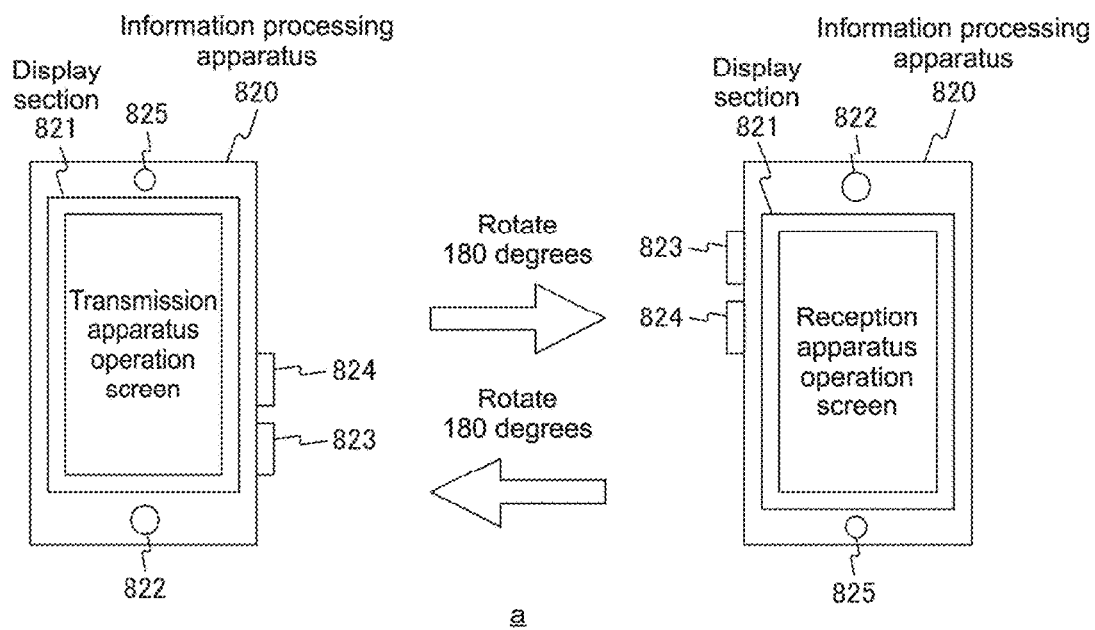
FIG. 20 Diagrams showing a switch example of an operation screen on a display section 821 of an information processing apparatus 820 according to the fourth embodiment of the present disclosure.
Figure 20:
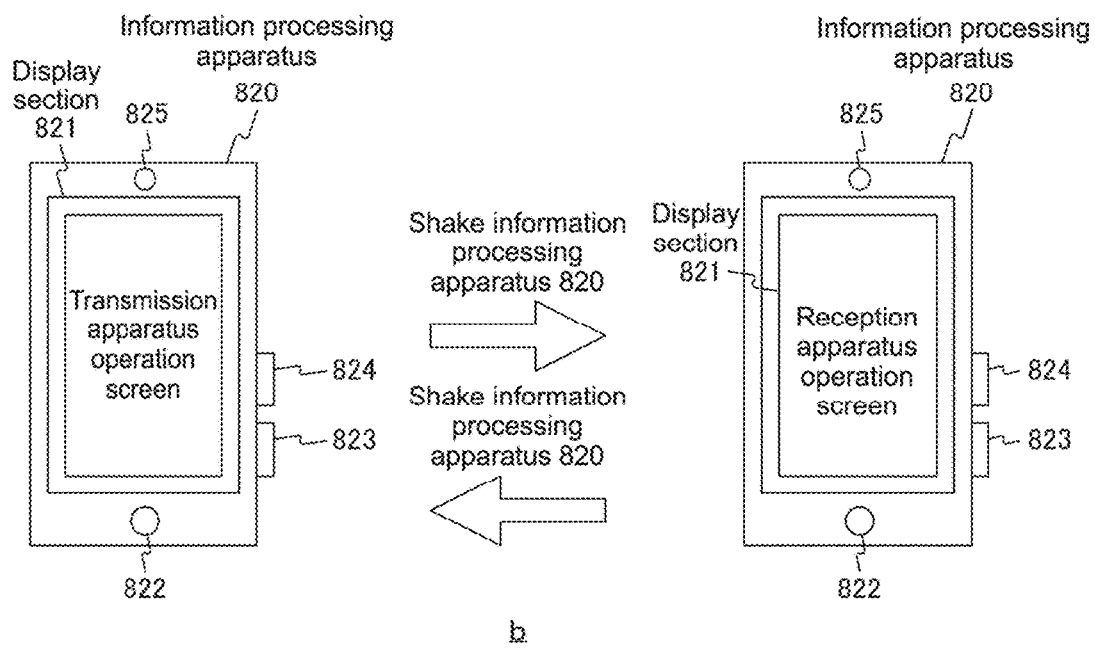

FIG. 20 are diagrams showing a switch example of the operation screens on the display section 821 of the information processing apparatus 820 according to the fourth embodiment of the present disclosure. FIG. 20 show a switch example of the operation screens using a sensor (e.g., gyro sensor) incorporated into the information processing apparatus 820. It should be noted that the sensor corresponds to the user information acquisition section 360 shown in FIG. 3.

FIG. 20A shows an example of switching the operation screens by rotating the information processing apparatus 820. For example, by rotating the information processing apparatus 820 180 degrees while using a direction vertical to the display surface of the display section 821 as a rotary axis, the transmission apparatus operation screen for performing an operation input with respect to the transmission apparatus and the reception apparatus operation screen for performing an operation input with respect to the reception apparatus can be switched. The rotation can be detected by a gyro sensor, for example.

FIG. 20B shows an example of switching the operation screens by causing the information processing apparatus 820 vibrate. For example, by the user shaking the information processing apparatus 820, the transmission apparatus operation screen for performing an operation input with respect to the transmission apparatus and the reception apparatus operation screen for performing an operation input with respect to the reception apparatus can be switched. The shaking operation can be detected by a gyro sensor, for example.

It should be noted that it is also possible to instruct the transmission apparatus to stop transmitting an image when an operation for displaying only the reception apparatus operation screen for performing an operation input with respect to the reception apparatus (e.g., rotation operation or shaking operation) is made.

(Example of Switching Operations According to Operation Member)

Figure 21:
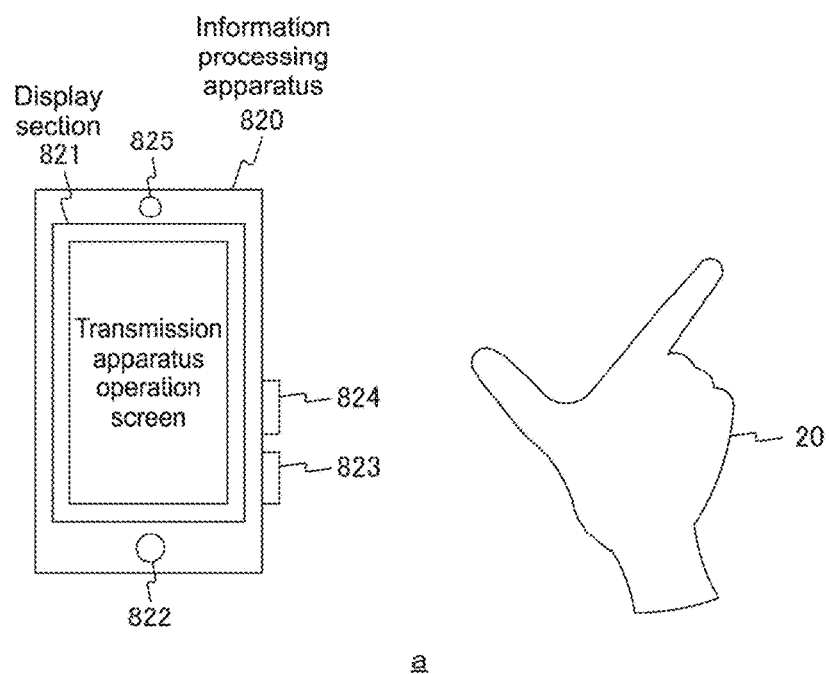
FIG. 21 Diagrams showing an operation switch example according to an operation member of the information processing apparatus 820 according to the fourth embodiment of the present disclosure.
Figure 21:
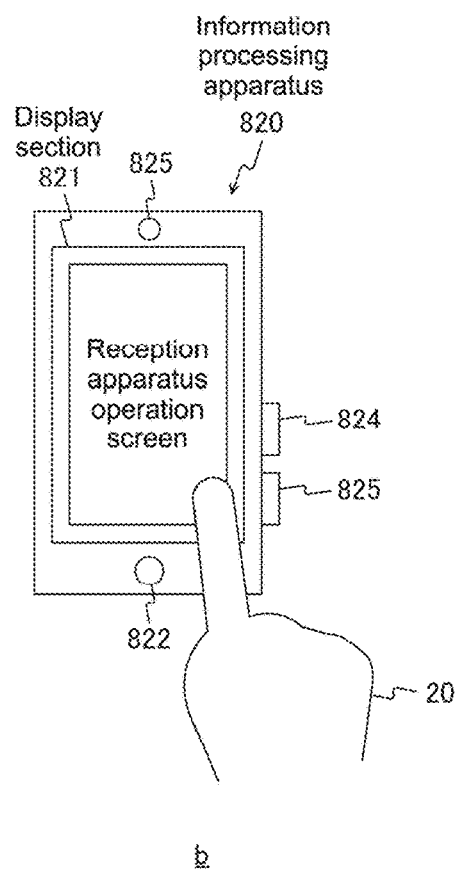

FIG. 21 are diagrams showing an example of switching operations according to an operation member of the information processing apparatus 820 according to the fourth embodiment of the present disclosure. FIG. 21 show an example of switching operations according to the display section 821 and the image pickup section 825 incorporated into the information processing apparatus 820.

Specifically, the display section 821 and the image pickup section 825 are allocated to an operation member for performing an operation input with respect to the transmission apparatus and an operation member for performing an operation input with respect to the reception apparatus.

For example, the image pickup section 825 of the information processing apparatus 820 is allocated as the operation member for performing an operation input with respect to the transmission apparatus, and the display section 821 (touch panel) of the information processing apparatus 820 is allocated as the operation member for performing an operation input with respect to the reception apparatus.

For example, as shown in FIG. 21A, by the user performing a predetermined gesture using a hand 20, an operation input with respect to the transmission apparatus can be made. For example, by the image pickup section 825 photographing the movement of the user hand 20 and performing pattern matching, an operation content corresponding to the movement of the hand 20 can be judged. As the method of judging the operation content, a known judgment method (see, for example, Japanese Patent Application Laid-open No. 2011-85966) can be used.

It should be noted that in FIG. 21A, the example of performing an operation input by capturing a gesture of the user using the image pickup section 825 has been described. However, an operation input may be made by inputting audio of the user.

Further, for example, by the user operating a touch panel using the hand 20 as shown in FIG. 21B, an operation input with respect to the reception apparatus can be made. In this case, it is also possible to display an image transmitted from the transmission apparatus and display the reception apparatus operation screen on top of that image. By such display, the operation with respect to the reception apparatus can be made without interrupting the display of the image transmitted from the transmission apparatus.

Here, for example, a touch panel may be provided on two surfaces (e.g., front side and back side) of the reception-side information processing apparatus. In this case, one surface (touch panel) can be allocated as the operation member for performing an operation input with respect to the transmission apparatus, and the other surface (touch panel) can be allocated as the operation member for performing an operation input with respect to the reception apparatus.

As described above, according to the fourth embodiment of the present disclosure, when performing an operation input with respect to the transmission apparatus or an operation input with respect to the reception apparatus, the operation input can be made with ease without using the operation member such as a mouse and a keyboard.

<5. Application Example>

The present disclosure is applicable to various products. For example, the information processing apparatuses 200, 300, 510, 520, 610, 710, 720, 730, 740, 750, 810, and 820 may be realized as a mobile terminal such as a smartphone, a tablet PC (Personal Computer), a laptop PC, a portable game terminal, and a digital camera, a fixed terminal such as a television receiver, a printer, a digital scanner, and a network storage, or an in-car terminal such as a car navigation apparatus. Alternatively, the information processing apparatuses 200, 300, 510, 520, 610, 710, 720, 730, 740, 750, 810, and 820 may be realized as a terminal that performs M2M (Machine To Machine) communication (also referred to as MTC (Machine Type Communication) terminal) such as a smart meter, a vending machine, a remote monitoring apparatus, and a POS (Point Of Sale) terminal. Alternatively, the information processing apparatuses 200, 300, 510, 520, 610, 710, 720, 730, 740, 750, 810, and 820 may be a wireless communication module mounted on those terminals (e.g., integrated circuit module constituted of single die).

(5-1. First Application Example)

Figure 22:
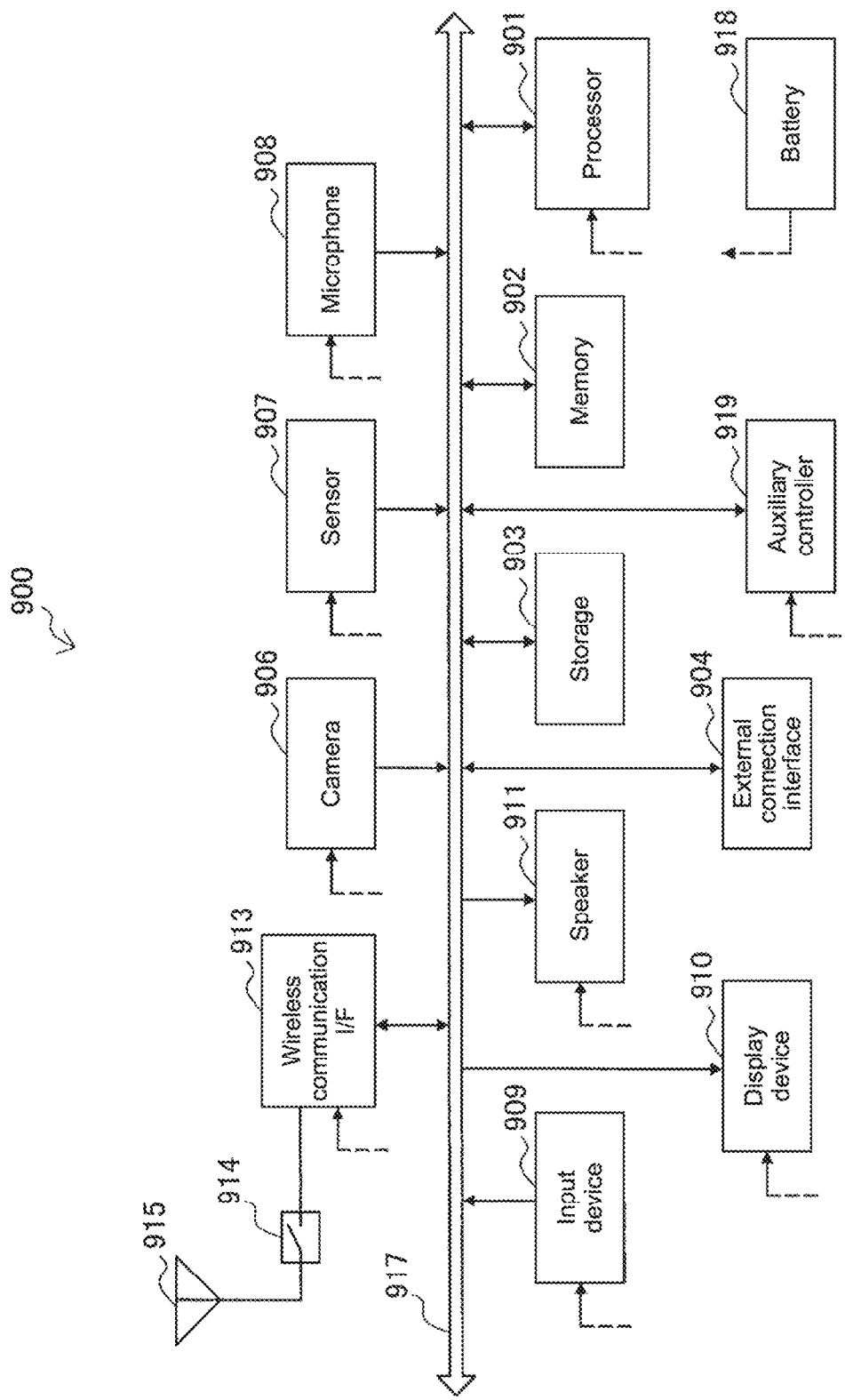
FIG. 22 A block diagram showing an example of a schematic structure of a smartphone.

FIG. 22 is a block diagram showing an example of a schematic structure of a smartphone 900 to which the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or a SoC (System on Chip) and controls an application layer of the smartphone 900 and functions of other layers. The memory 902 includes a RAM (Random Access Memory) and a ROM (Read Only Memory) and stores programs executed by the processor 901 and data. The storage 903 may include a recording medium such as a semiconductor memory and a hard disk. The external connection interface 904 is an interface for connecting an external device such as a memory card and a USB (Universal Serial Bus) device to the smartphone 900.

The camera 906 includes an image pickup device such as a CCD (Charge Coupled Device) and a CMOS (Complementary Metal Oxide Semiconductor) and generates a pickup image. The sensor 907 may include a sensor group including a positioning sensor, a gyro sensor, a geomagnetic sensor, and an acceleration sensor. The microphone 908 converts audio input to the smartphone 900 into audio signals. The input device 909 includes, for example, a touch sensor that detects a touch operation on a screen of the display device 910, a keypad, a keyboard, buttons, and a switch and accepts user operations and information input. The display device 910 includes a screen such as a liquid crystal display (LCD) and an organic light-emitting diode (OLED) display and displays an output image of the smartphone 900. The speaker 911 converts audio signals output from the smartphone 900 into audio.

The wireless communication interface 913 supports one or more wireless LAN standards of IEEE802.11a, 11b, 11g, 11n, 11ac, 11ad, and the like and executes wireless communication. The wireless communication interface 913 can communicate with other apparatuses via a wireless LAN access point in an infrastructure mode. Further, in an ad hoc mode, the wireless communication interface 913 can directly communicate with other apparatuses. The wireless communication interface 913 typically includes a baseband processor, an RF (Radio Frequency) circuit, and a power amplifier. The wireless communication interface 913 may be a one chip module in which a memory that stores a communication control program, a processor that executes the program, and relevant circuits are integrated. The wireless communication interface 913 may support other types of wireless communication systems such as a near-field wireless communication system, a proximity wireless communication system, and a cellular communication system in addition to the wireless LAN system. The antenna switch 914 switches a connection destination of the antenna 915 among a plurality of circuits included in the wireless communication interface 913 (e.g., circuits for different wireless communication systems). The antenna 915 includes one or a plurality of antenna devices (e.g., plurality of antenna devices constituting MIMO antenna) and is used for transmitting and receiving wireless signals by the wireless communication interface 913.

It should be noted that the smartphone 900 may include a plurality of antennas (e.g., antenna for wireless LAN and antenna for proximity wireless communication system) without being limited to the example shown in FIG. 22. In this case, the antenna switch 914 may be omitted from the structure of the smartphone 900.

The bus 917 mutually connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919. The battery 918 supplies power to the blocks of the smartphone 900 shown in FIG. 22 via a power supply line partially indicated by a broken line in the figure. The auxiliary controller 919 causes a minimum function necessary for the smartphone 900 to be operated in a sleep mode, for example.

In the smartphone 900 shown in FIG. 22, the controller 240 described with reference to FIG. 2 may be mounted on the wireless communication interface 913. In addition, the control signal generation section 370 described with reference to FIG. 3 may be mounted on the wireless communication interface 913. In addition, the controller 240 and the control signal generation section 712 described with reference to FIG. 16 may be mounted on the wireless communication interface 913. Furthermore, at least a part of the functions may be mounted on the processor 901 or the auxiliary controller 919. vehicle It should be noted that the smartphone 900 may operate as a wireless access point (software AP) by the processor 901 executing an access point function on an application level. Moreover, the wireless communication interface 913 may be provided with the wireless access point function.

(5-2. Second Application Example)

FIG. 23 is a block diagram showing an example of a schematic structure of a car navigation apparatus 920 to which the present disclosure can be applied. The car navigation apparatus 920 includes a processor 921, a memory 922, a GPS (Global Positioning System) module 924, a sensor 925, a data interface 926, a content player 927, a recording medium interface 928, an input device 929, a display device 930, a speaker 931, a wireless communication interface 933, an antenna switch 934, an antenna 935, and a battery 938.

The processor 921 may be, for example, a CPU or a SoC and controls a navigation function of the car navigation apparatus 920 and other functions. The memory 922 includes a RAM and a ROM and stores programs to be executed by the processor 921 and data.

The GPS module 924 uses GPS signals received from a GPS satellite to measure a position of the car navigation apparatus 920 (e.g., latitude, longitude, and altitude). The sensor 925 may include a sensor group including, for example, a gyro sensor, a geomagnetic sensor, and an atmospheric pressure sensor. The data interface 926 is connected to an in-car network 941 via a terminal (not shown), for example, and acquires data generated on a car side such as car speed data.

The content player 927 reproduces contents stored in a recording medium (e.g., CD or DVD) inserted into the recording medium interface 928. The input device 929 includes, for example, a touch sensor that detects a touch on the screen of the display device 930, a button, and a switch and accepts a user operation or an information input. The display device 930 includes a screen such as an LCD and an OLED display and displays images of the navigation function or a content to be reproduced. The speaker 911 outputs audio of the navigation function or a content to be reproduced.

The wireless communication interface 933 supports one or more wireless LAN standards of IEEE802.11a, 11b, 11g, 11n, 11ac, 11ad, and the like and executes wireless communication. The wireless communication interface 933 can communicate with other apparatuses via a wireless LAN access point in an infrastructure mode. Further, in an ad hoc mode, the wireless communication interface 933 can directly communicate with other apparatuses. The wireless communication interface 933 typically includes a baseband processor, an RF circuit, and a power amplifier. The wireless communication interface 933 may be a one chip module in which a memory that stores a communication control program, a processor that executes the program, and relevant circuits are integrated. The wireless communication interface 933 may support other types of wireless communication systems such as a near-field wireless communication system, a proximity wireless communication system, and a cellular communication system in addition to the wireless LAN system. The antenna switch 934 switches a connection destination of the antenna 935 among a plurality of circuits included in the wireless communication interface 933. The antenna 935 includes one or a plurality of antenna devices and is used for transmitting and receiving wireless signals by the wireless communication interface 933.

It should be noted that the car navigation apparatus 920 may include a plurality of antennas without being limited to the example shown in FIG. 23. In this case, the antenna switch 934 may be omitted from the structure of the car navigation apparatus 920.

The battery 938 supplies power to the blocks of the car navigation apparatus 920 shown in FIG. 23 via a power supply line partially indicated by a broken line in the figure. Further, the battery 938 accumulates power supplied from the car side.

In the car navigation apparatus 920 shown in FIG. 23, the controller 240 described with reference to FIG. 2 may be mounted on the wireless communication interface 933. In addition, the control signal generation section 370 described with reference to FIG. 3 may be mounted on the wireless communication interface 933. In addition, the controller 240 and the control signal generation section 712 described with reference to FIG. 16 may be mounted on the wireless communication interface 933. Furthermore, at least a part of the functions may be mounted on the processor 921.

Further, the present disclosure may be realized as an in-car system (or car) 940 including one or more blocks of the car navigation apparatus 920 described above, the in-car network 941, and a car-side module 942. The car-side module 942 generates car-side data including a car speed, an engine rotation count, and malfunction information and outputs the generated data to the in-car network 941.

Here, a communication system in which images and audio output from the information processing apparatus (or images and audio generated by image pickup operation of information processing apparatus) are transmitted to other information processing apparatuses in real time via a network so as to be output will be discussed.

In general, image/audio information is compressed and transmitted via a network. Moreover, the image/audio information has a larger volume than letter information, and a processing amount requisite for the compression and transmission becomes larger as a definition of the image/audio before being compressed becomes higher. Furthermore, information to be transmitted requires a wide network band.

Further, in the reception-side information processing apparatus that receives and output an image/audio, a processing amount necessary for the reception, development, and output becomes large as in the case of the transmission-side information processing apparatus.

Here, processing performance of the information processing apparatus per unit time and a network band between the transmission-side and reception-side information processing apparatuses are finite. Therefore, there is a need to cut the processing amount or network band depending on the use state of the information processing apparatus in the communication system (or environment where communication system exists). For example, there is a need to cut the processing amount or network band when other processing is being carried out in the transmission-side and reception-side information processing apparatuses or when the information processing apparatus (transmission side or reception side) is additionally using a network band on the connected network.

Here, the method of cutting a processing amount or use network band of the information processing apparatus by operating the information processing apparatus receiving an image/audio is widely known. For example, in a moving image viewing application, the definition can be adjusted by a viewing user operating an "image quality" option. For example, by the viewing user operating the "image quality" option, the operation content is notified to the moving image distribution server via a network. Based on the notification, the definition can be raised (increase processing amount and band) or the definition can be lowered (decrease processing amount and band). In this method, a determination by the user him/herself is necessary, and an operation of the reception-side information processing apparatus corresponding to the determination also becomes necessary. Here, the determination of the user him/herself refers to a check of an interrupted state while a moving image is being reproduced and a determination on a lack of a CPU time allocation requisite for developing and displaying a moving image, a poor quality of a network, and the like based on an experimental rule.

In this regard, a mechanism for automatically changing an information amount (bit rate) of an image/audio per unit time according to the network state (transmission quality) is widely used. For example, there is occupying band control using Adaptive bitrate streaming or RTCP (RTP Control Protocol). In a system to which those mechanisms are applied, a bit rate of an image/audio may be determined irrespective of an intention of a user.

For example, a case where, in a system to which those mechanisms are applied, a user viewing the reception apparatus does not focus on the display screen or a case where the user acts to operate a different application using the reception apparatus (or another terminal on network) will be described. In this case, it is assumed that the bit rate of the image/audio being received by the reception apparatus is kept high, and a sufficient network band is not allocated to another application.

Moreover, for example, a case of lowering the definition of an image transmitted from the transmission apparatus for cutting the band and processing amount will be discussed. In this case, for example, an image displayed (or captured) by the transmission apparatus has a larger information amount and resolution than an image displayed on the reception apparatus. Therefore, an area of the image to be received needs to be changed by operating the display screen of the reception apparatus so that a desired image is displayed while fitting in the display screen of the reception apparatus, with the result that the operation becomes complex.

In contrast, in the embodiment of the present disclosure, user information (e.g., operation, state, and intention of user) is acquired by the transmission apparatus or the reception apparatus, and the user information can be used for band control of a stream output from the reception apparatus. In other words, according to the embodiment of the present disclosure, appropriate transmission band control corresponding to the operation, state, and intention of the user can be performed.

It should be noted that although the embodiment of the present disclosure has taken the display apparatus and mobile information processing apparatus including wireless communication functions, and the like as an example, the embodiment of the present disclosure is also applicable to other information processing apparatuses having a wireless communication function. For example, the embodiment of the present disclosure is applicable to information processing apparatuses such as a home game apparatus, a portable video processing apparatus, a portable game apparatus, and a digital photo frame. Moreover, for example, the embodiment of the present disclosure is also applicable to an information processing apparatus capable of performing wireless communication by incorporating a wireless communication apparatus including a wireless communication function (e.g., personal computer not provided with wireless communication function).

It should be noted that the embodiments above have described examples for embodying the present disclosure, and the items of the embodiments and the specific items in the claims have correspondence relations. Similarly, the specific items in the claims and the items in the embodiments of the present disclosure given the same name have correspondence relations. It should be noted that the present disclosure is not limited to the embodiments and can be variously modified without departing from the gist of the present disclosure.

Further, the processing procedures described in the embodiments above may be grasped as a method including the series of procedures, a program for causing a computer to execute the series of procedures, or a recording medium onto which the program is recorded. As the recording medium, for example, a CD (Compact Disc), an MD (Mini Disc), a DVD (Digital Versatile Disc), a memory card, and a Blu-ray disc (registered trademark) can be used.

It should be noted that the present disclosure may also take the following structures.

(1) An information processing apparatus, including:
an acquisition section that acquires user information generated by a user operation when information based on a stream communicated between another information processing apparatus via wireless communication is output from an output section; and
a controller that performs band control of the stream based on the acquired user information.

(2) The information processing apparatus according to (1), further including
the output section,
in which the output section outputs information based on the stream transmitted from the another information processing apparatus, and
in which the controller performs the band control of the stream transmitted from the another information processing apparatus based on the acquired user information.

(3) The information processing apparatus according to (2),
in which each output section outputs information based on a stream transmitted from a plurality of another information processing apparatuses, and
in which the controller performs the band control of the stream based on the acquired user information.

(4) The information processing apparatus according to (2) or (3),
in which the controller transmits a control signal for performing the band control of the stream transmitted from the another information processing apparatus to the another information processing apparatus.

(5) The information processing apparatus according to any one of (1) to (4),
in which the output section is a display section that displays an image based on the stream, and
in which the acquisition section acquires the user information generated by a user operation related to the image displayed on the display section.

(6) The information processing apparatus according to (5),
in which the controller performs control for changing a definition of the image based on the acquired user information.

(7) The information processing apparatus according to (5),
in which the controller performs control for changing a display area of the image on the display section based on the acquired user information.

(8) The information processing apparatus according to (5),
in which the controller performs control for changing a size of the image on the display section based on the acquired user information.

(9) The information processing apparatus according to any one of (5) to (8),
in which the acquisition section acquires user information generated based on a focus point of a user in the image displayed on the display section.

(10) The information processing apparatus according to any one of (5) to (8),
in which the acquisition section acquires the user information generated based on the user operation related to the image displayed on the display section.

(11) The information processing apparatus according to (1),
in which the another information processing apparatus further includes the output section,
in which the output section outputs information based on the stream transmitted from the information processing apparatus, and
in which the controller performs the band control of the stream to be transmitted to the another information processing apparatus based on the acquired user information.

(12) An information processing method, including:
an acquisition step for acquiring user information generated by a user operation when information based on a stream communicated between another information processing apparatus via wireless communication is output from an output section; and
a control step for performing band control of the stream based on the acquired user information.

(13) A program that causes a computer to execute:
an acquisition step for acquiring user information generated by a user operation when information based on a stream communicated between another information processing apparatus via wireless communication is output from an output section; and
a control step for performing band control of the stream based on the acquired user information.

DESCRIPTION OF REFERENCE NUMERALS 100, 500, 600, 700, 800 communication system
200, 300, 510, 520, 610, 710, 720, 730, 740, 750, 810, 820 information processing apparatus
210, 310 antenna
220, 320 wireless communication section
230 control signal reception section
240 controller
250 image/audio signal generation section
260 image/audio compression section
270 stream transmission section
330 stream reception section
340 image/audio development section
350 image/audio output section
351, 521, 611, 715, 811, 821 display section
352 audio output section
360, 711 user information acquisition section
361, 825 image pickup section
370, 712 control signal generation section
380 control signal transmission section
900 smartphone
901 processor
902 memory
903 storage
904 external connection interface
906 camera
907 sensor
908 microphone
909 input device
910 display device
911 speaker
913 wireless communication interface
914 antenna switch
915 antenna
917 bus
918 battery
919 auxiliary controller 920 car navigation apparatus
921 processor
922 memory
924 GPS module
925 sensor
926 data interface
927 content player
928 recording medium interface
929 input device
930 display device
931 speaker
933 wireless communication interface
934 antenna switch
935 antenna
938 battery
941 in-car network
942 car-side module

The invention claimed is:

1. A first information processing apparatus, comprising:
a display screen; and
circuitry configured to:
receive a first stream from a second information processing apparatus via wireless communication;
output first information based on the first stream;
detect a focus point of a user with respect to the first information based on a first distance between a left eye of the user and a right eye of the user;
receive an operation from the user;
acquire user information that comprises the focus point and a position of the operation, wherein the position of the operation corresponds to a position on the display screen;
determine a focus degree of the user based on the focus point and the position on the display screen;
determine a focus position change vector based on a deviation of the focus degree from a center of the display screen; and
control a band of the first stream based on the focus position change vector and the user information.

2. The first information processing apparatus according to claim 1, further comprising a speaker configured to output the first information based on the first stream.

3. The first information processing apparatus according to claim 2, wherein the circuitry is further configured to:
receive a second stream from a third information processing apparatus of a plurality of information processing apparatuses;
output the first information based on the second stream; and
control a band of the second stream based on the user information.

4. The first information processing apparatus according to claim 1, wherein
the circuitry is further configured to transmit a control signal to the second information processing apparatus, and
the control signal is transmitted to control the band of the first stream.

5. The first information processing apparatus according to claim 1, wherein
the display screen is configured to display an image based on the first stream, and
the circuitry is further configured to acquire the user information based on the image displayed on the display screen.

6. The first information processing apparatus according to claim 5, wherein the circuitry is further configured to change a resolution of the image based on the user information.

7. The first information processing apparatus according to claim 5, wherein the circuitry is further configured to change a display area of the image on the display screen based on the user information.

8. The first information processing apparatus according to claim 5, wherein the circuitry is further configured to change a size of the image on the display screen based on the user information.

9. The first information processing apparatus according to claim 5, wherein the operation is associated with the image displayed on the display screen.

10. The first information processing apparatus according to claim 1, wherein
the circuitry is further configured to:
transmit a third stream to the second information processing apparatus; and
control a band of the third stream based on the user information, and
the second information processing apparatus outputs the first information based on the third stream.

11. The first information processing apparatus according to claim 5, wherein the circuitry is further configured to detect the focus point based on a distance of the user from the display screen.

12. The first information processing apparatus according to claim 1, wherein the circuitry is further configured to:
transmit a control signal to the second information processing apparatus based on a value of the focus degree,
wherein the control signal is transmitted to stop transmission of the first stream from the second information processing apparatus.

13. The first information processing apparatus according to claim 6, wherein the circuitry is further configured to:
increase the resolution of the image based on a value of the focus degree that is larger than a first threshold, and
decrease the resolution of the image based on the value of the focus degree that is smaller than a second threshold.

14. The first information processing apparatus according to claim 1,
wherein the circuitry is further configured to detect a position of the focus point based on an eye tracking process, and
wherein the focus degree of the user focus point indicates a trajectory of the focus point for a specific time period.

15. The first information processing apparatus according to claim 1,
wherein the circuitry is further configured to:
determine the deviation of the focus point from the center of the display screen; and
determine the focus position change vector based on the determination that the deviation of the focus point from the center of the display screen is larger than a threshold distance.

16. An information processing method, comprising:
in a first information processing apparatus comprising a display screen
receiving a stream from a second information processing apparatus via wireless communication;
controlling output of first information based on the stream
detecting a focus point of a user with respect to the first information based on a first distance between a left eye of the user and a right eye of the user;
receiving an operation from the user;

acquiring user information that comprises the focus point and a position of the operation, wherein the position of the operation corresponds to a position on the display screen;

determining a focus degree of the user based on the focus point and the position on the display screen;

determining a focus position change vector based on a deviation of the focus degree from a center of the display screen; and controlling a band of the stream based on the focus position change vector and the user information.

17. A non-transitory computer-readable medium having stored thereon computer-executable instructions which, when executed by a processor of a first information processing apparatus, cause the processor to execute operations, the operations comprising:

receiving a stream from a second information processing apparatus via wireless communication;

controlling output of first information based on the stream;

detect a focus point of a user with respect to the first information based on a first distance between a left eye of the user and a right eye of the user;

receiving an operation from the user;

acquiring user information that comprises the focus point and a position of the operation, wherein the position of the operation corresponds to a position on a display screen of the first information processing apparatus;

determining a user focus degree based on the focus point and the position on the display screen;

determining a focus position change vector based on a deviation of the focus degree from a center of the display screen of the first information processing apparatus; and controlling a band of the stream based on the focus position change vector and the user information.

* * * * *